(12) United States Patent
Kappel et al.

(10) Patent No.: US 9,585,313 B2
(45) Date of Patent: Mar. 7, 2017

(54) INDEXABLE STUMP CUTTER TOOTH

(76) Inventors: Gary W. Kappel, Peli, IA (US);
Thomas R. Lyng, Pelia, IA (US); Cary D. Ritchey, Roaring Spring, PA (US);
Don C. Rowlett, Bedford, PA (US)

( * ) Notice: Subject to any disclaimer, the term of this patent is extended or adjusted under 35 U.S.C. 154(b) by 1152 days.

(21) Appl. No.: 13/210,465

(22) Filed: Aug. 16, 2011

(65) Prior Publication Data

US 2012/0012229 A1    Jan. 19, 2012

Related U.S. Application Data

(62) Division of application No. 11/807,411, filed on May 29, 2007, now Pat. No. 8,020,591.

(60) Provisional application No. 60/856,173, filed on Nov. 2, 2006.

(51) Int. Cl.
*A01G 23/06* (2006.01)

(52) U.S. Cl.
CPC .................................. *A01G 23/067* (2013.01)

(58) Field of Classification Search
CPC .. A01G 23/067; A01G 23/093; A01G 23/091; B02C 18/145; B23C 2200/081
USPC ....................... 144/24.12, 176, 218, 241, 235
See application file for complete search history.

(56) References Cited

U.S. PATENT DOCUMENTS

| 2,121,044 | A | * | 6/1938 | Noble ................. E21C 35/1933 |
|---|---|---|---|---|
| | | | | 299/101 |
| 2,736,352 | A | | 2/1956 | Wright |
| 2,992,664 | A | * | 7/1961 | De Shano ...................... 144/235 |
| 3,642,214 | A | | 2/1972 | Blackwell, Jr. |
| 3,797,544 | A | | 3/1974 | Ver Ploeg |
| 3,845,796 | A | * | 11/1974 | Moore ........................... 144/1.1 |
| 3,935,887 | A | * | 2/1976 | Van Zante et al. ........... 144/235 |
| 4,193,638 | A | | 3/1980 | Heckenhauer |
| 4,627,665 | A | | 12/1986 | Ewing et al. |
| 4,759,394 | A | | 7/1988 | Clemenson |
| 4,932,447 | A | | 6/1990 | Morin |
| 4,974,649 | A | | 12/1990 | Manning |
| 4,998,574 | A | | 3/1991 | Beach et al. |

(Continued)

FOREIGN PATENT DOCUMENTS

| CA | 1 269 028 | 6/1992 | |
|---|---|---|---|
| EP | 1457106 A1 * | 9/2004 | ............. A01G 23/06 |
| WO | 9520453 A1 | 8/1995 | |

OTHER PUBLICATIONS

The Stump Cutter King website (Oct. 21, 2014), webcache Google, Yellow Jacket Stump Cutters.*

(Continued)

*Primary Examiner* — Matthew G Katcoff
(74) *Attorney, Agent, or Firm* — Matthew S. Bedsole

(57) ABSTRACT

A stump cutter assembly that has a driven wheel with first and wheel side surfaces, and a first stump cutter tooth assembly operatively attaches to the first wheel side surface and a second stump cutter tooth assembly operatively attaches to the second wheel side surface. The first stump cutter tooth assembly includes a first stump cutter tooth and a first bi-directional pocket member that non-rotatably retains the first stump cutter tooth. The second stump cutter tooth assembly includes a second stump cutter tooth and a second bi-directional pocket member that non-rotatably retains the second stump cutter tooth. The first stump cutter tooth assembly is in general transverse alignment with the second stump cutter tooth assembly.

15 Claims, 20 Drawing Sheets

(56) References Cited

U.S. PATENT DOCUMENTS

| | | |
|---|---|---|
| 5,058,477 A | 10/1991 | MacLennan |
| 5,085,112 A | 2/1992 | MacLennan |
| 5,088,371 A | 2/1992 | MacLennan |
| 5,113,919 A | 5/1992 | MacLennan |
| 5,131,305 A | 7/1992 | MacLennan |
| 5,205,199 A | 4/1993 | MacLennan |
| 5,211,212 A | 5/1993 | Carlson et al. |
| 5,269,355 A | 12/1993 | Bowen |
| 5,303,752 A | 4/1994 | MacLennan |
| 5,307,719 A | 5/1994 | MacLennan |
| 5,497,815 A | 3/1996 | Bowling |
| 5,623,978 A | 4/1997 | Clemenson |
| 5,644,965 A | 7/1997 | MacLennan et al. |
| 5,743,314 A | 4/1998 | Puch |
| 5,819,827 A | 10/1998 | Leonardi |
| 5,996,657 A | 12/1999 | Riesseiman |
| 6,024,143 A * | 2/2000 | Ritchey ............... A01G 23/067 144/24.12 |
| 6,138,725 A * | 10/2000 | Leonardi et al. ............. 144/235 |
| 6,176,445 B1 | 1/2001 | Shinn |
| 6,382,277 B1 | 5/2002 | Paumier et al. |
| 6,536,322 B1 | 3/2003 | Butler et al. |
| 6,546,977 B1 | 4/2003 | Monyak et al. |
| 6,708,743 B2 | 3/2004 | Ziehm |
| 6,848,485 B1 | 2/2005 | Paumier et al. |
| 7,104,294 B2 | 9/2006 | Kopocs et al. |
| 7,204,442 B2 | 4/2007 | Roozeboom et al. |
| 7,213,623 B2 | 5/2007 | Shinn |
| 7,299,836 B2 | 11/2007 | Green |
| 7,418,986 B2 | 9/2008 | Watts |
| 7,448,567 B2 | 11/2008 | Roozeboom et al. |
| 7,624,490 B2 | 12/2009 | Bardos |
| 7,634,897 B2 | 12/2009 | MacLennan et al. |
| 7,743,803 B2 | 6/2010 | Paumier |
| 7,913,432 B2 | 3/2011 | MacLennan et al. |
| 8,020,591 B2 | 9/2011 | Kappel et al. |
| 2003/0188802 A1* | 10/2003 | Green ........................... 144/241 |
| 2004/0172828 A1* | 9/2004 | Kammerer ........................ 30/1 |
| 2005/0087262 A1* | 4/2005 | Clemenson .................. 144/176 |
| 2005/0166997 A1 | 8/2005 | Shinn |
| 2005/0173023 A1* | 8/2005 | Cao ........................... 144/24.12 |
| 2005/0217756 A1* | 10/2005 | Cao .............................. 144/241 |
| 2006/0102247 A1* | 5/2006 | Green ....................... 144/24.12 |
| 2008/0105334 A1 | 5/2008 | Leonardi et al. |
| 2008/0142116 A1* | 6/2008 | Green ....................... 144/24.12 |
| 2008/0142120 A1* | 6/2008 | Green ........................... 144/241 |
| 2008/0149224 A1* | 6/2008 | Kappel et al. ................ 144/241 |
| 2008/0190519 A1* | 8/2008 | Green ........................... 144/241 |
| 2010/0043922 A1* | 2/2010 | Leonardi et al. ............. 144/235 |
| 2014/0196818 A1* | 7/2014 | Weinberg et al. ............ 144/235 |
| 2014/0338791 A1* | 11/2014 | Green et al. ................. 144/235 |

OTHER PUBLICATIONS

Vermeer Manufacturing Company, Yellow Jacket Cutter System (Copyright 2006), all pages.*

QUADCO, Quad Tooth System Brochure, 6 pages.

* cited by examiner

STRAIGHT

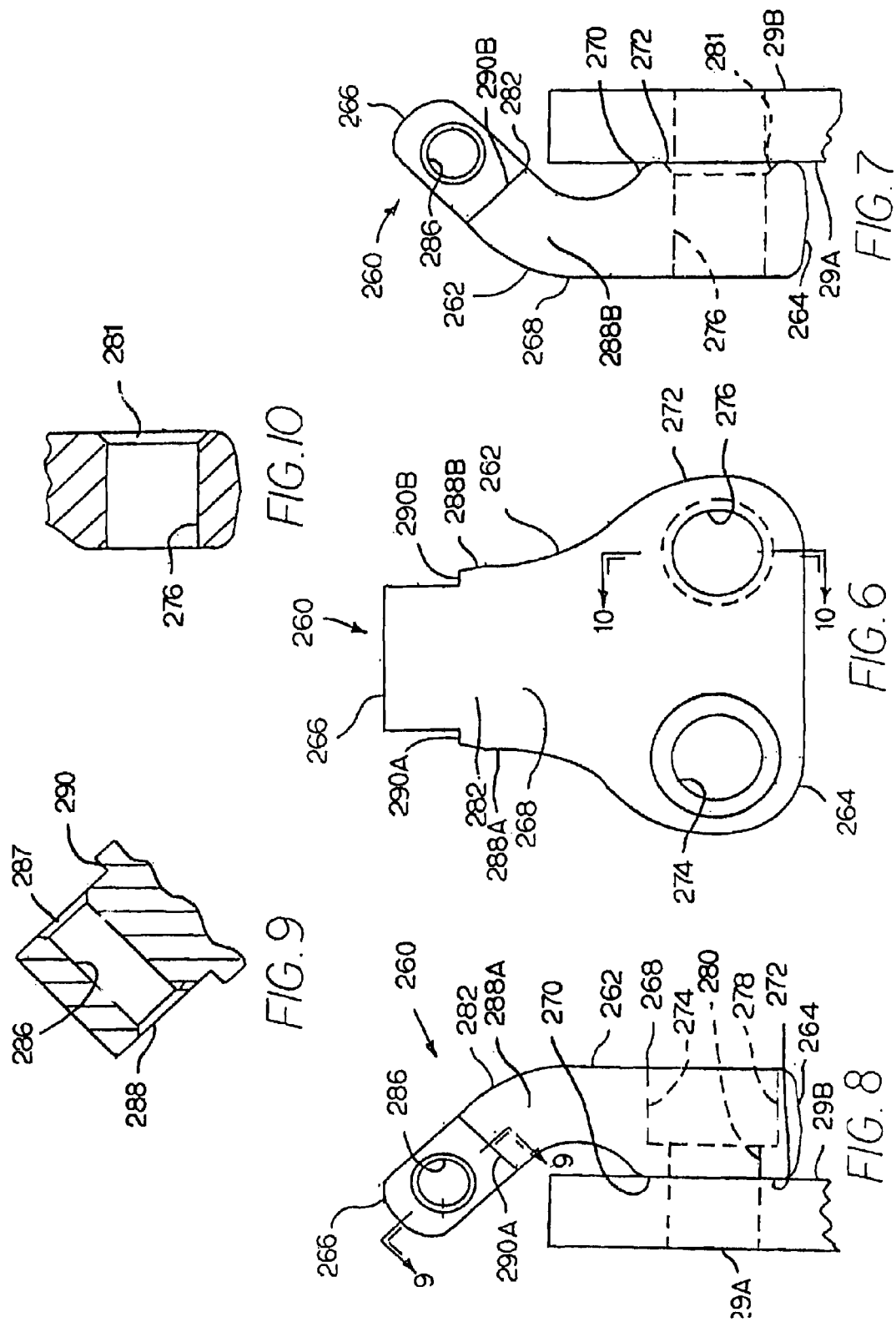

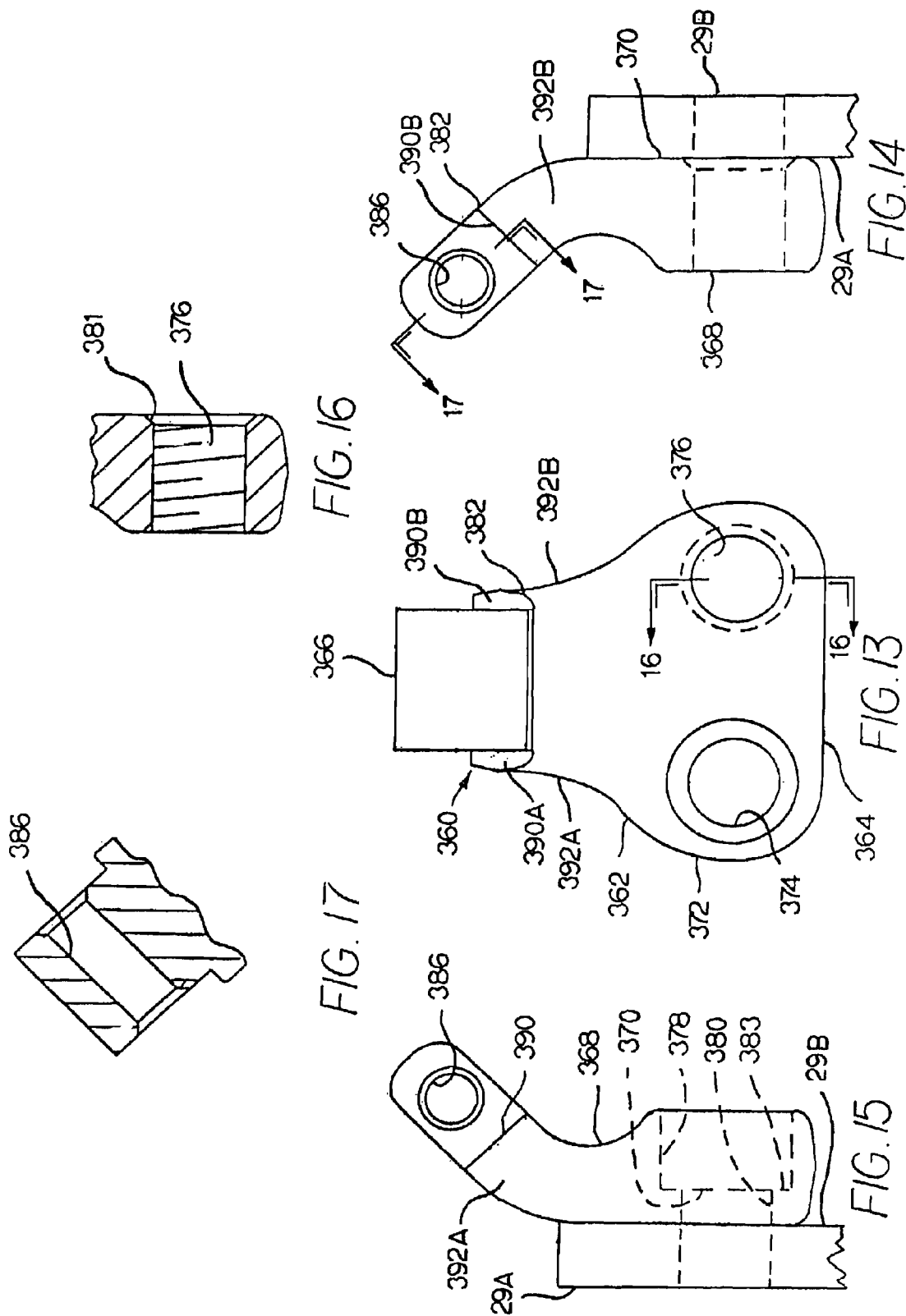

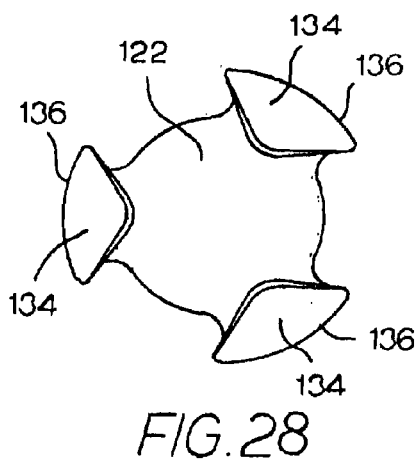
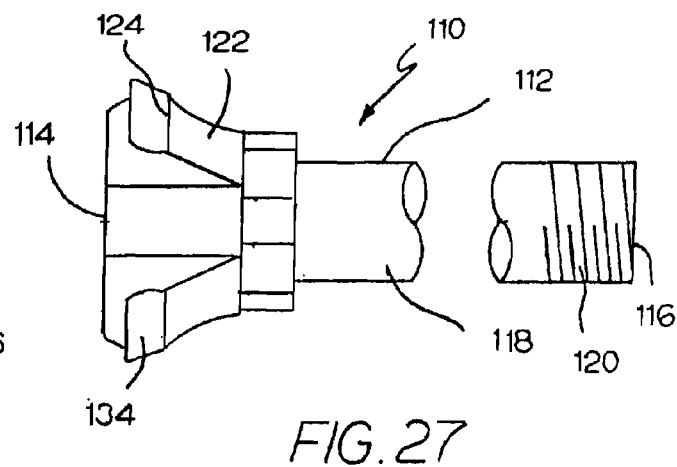
FIG. 28        FIG. 27
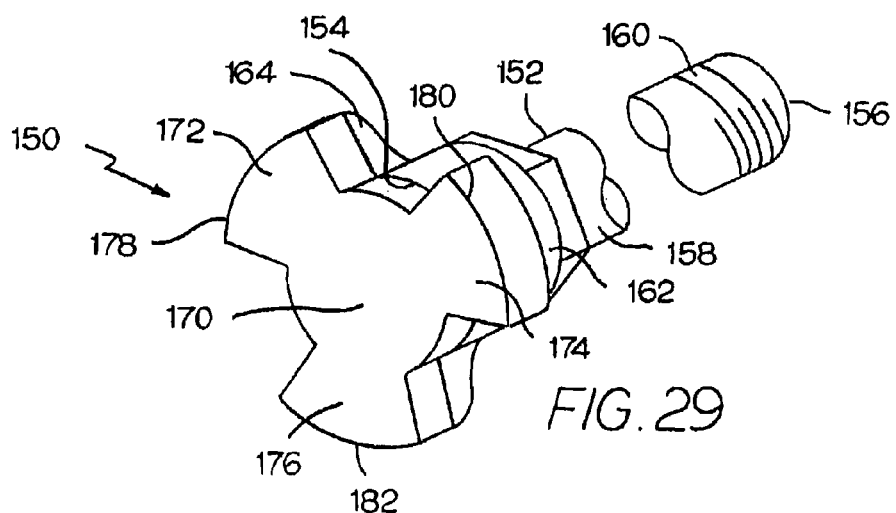
FIG. 29
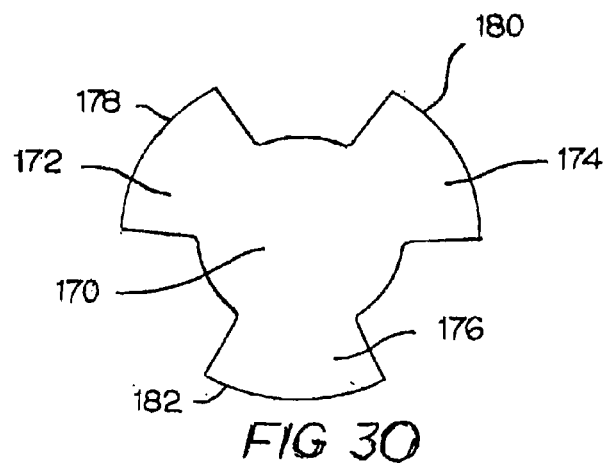
FIG 30

INDEXABLE STUMP CUTTER TOOTH

REFERENCE TO EARLIER RELATED PATENT APPLICATION

This application is a Divisional of U.S. patent application Ser. No. 11/807,411, filed May 29, 2007, entitled INDEXABLE STUMP CUTTER TOOTH, and is hereby incorporated by reference herein in its entirety, claiming priority therefrom, and which was a non-provisional of U.S. Patent Provisional Application Ser. No. 60/856,173, filed Nov. 2, 2006, entitled INDEXABLE STUMP CUTTER, also hereby incorporated by reference herein in its entirety, claiming priority therefrom.

BACKGROUND OF THE INVENTION

The present invention pertains to a cutter tooth that has a hard insert at the axial forward end wherein the cutter tooth is useful to impinge and/or disintegrate a piece of material such as, for example, wood or earth strata. More specifically, the invention pertains to such a cutter tooth (such as, for example, an indexable stump cutter tooth), that when used in a stump cutter machine allows the stump cutter machine to experience an increase in operational efficiency (i.e., a reduction in operational downtime), as compared to a stump cutter machine that used earlier stump cutter teeth.

Heretofore, there have been machines used to impinge and/or disintegrate materials such as, for example, wood and/or earth strata. These machines have included (without limitation) machines used to cut or disintegrate wood or brush such as, for example, land-clearing machines, tub grinders, stump cutters and force feed grinders.

In the case of stump cutter machines (i.e., stump cutters), they have a plurality of teeth or stump cutter teeth mounted in the vicinity of the periphery (including without limitation at or near the circumference of) a driven wheel. The stump cutter is positioned near the stump, and then the wheel is driven (or rotated) and then moved in a radial sweeping motion whereby the moving stump cutter teeth impinge the stump. After having made a number of cuts or passes into the stump, the result is that the stump has been disintegrated below the surface of the ground. Exemplary patent documents that disclose a stump cutter include U.S. Pat. No. 6,024,143 to Ritchey for a CUTTING TOOTH ASSEMBLY, U.S. Pat. No. 5,497,815 to Bowling for a CUTTING TOOTH, U.S. Pat. No. 5,743,314 to Puch for a STUMP CUTTING TOOL ASSEMBLY, and U.S. Pat. No. 4,998,574 to Beach for a CUTTING BIT AND BLOCK MOUNT.

In a stump cutting operation, it is desirable for the stump cutter machine to maintain an optimum operational efficiency (i.e., a reduction in operational downtime). Operational efficiency of the stump cutter machine can be impacted by a number of factors including without limitation the ability of the stump cutter tooth assembly used by the machine to resist breakage and/or wear (and especially premature breakage and/or wear) of any component of the stump cutter tooth or the pocket (i.e., the holder that carries and retains the stump cutter tooth). Operational efficiency of the stump cutter machine is also impacted by being able to easily place back into service a stump cutter assembly used on the machine that has experienced (without limitation) a worn or damaged stump cutter tooth or a worn or damaged pocket.

Stump cutter teeth, as well as the supporting structure (i.e., the pocket), experience a great deal of stress during the stump cutting operation. During the stump cutting process, stump cutter teeth can experience catastrophic breakage, as well as become worn past a point of usefulness. Breakage or wear can occur in the steel body of the stump cutter tooth or in the axial forward hard insert affixed to the steel tooth body. When a stump cutter tooth breaks or wears past a point of usefulness, the stump cutter machine must be stopped, and the tooth must be replaced with another stump cutter tooth. The time and expense connected with the replacement of stump cutter teeth reduces the overall operational efficiency of the stump cutter machine (or apparatus). It would be advantageous to provide an improved stump cutter tooth that experiences a reduction in events (e.g., the breakage or wear) that require replacement thereof.

During the stump cutting process, the pockets (including the bolts or fasteners retaining the cutter tooth to the pocket) can also experience breakage and/or wear to such an extent that they must be replaced. Breakage of the fasteners (or bolts) can cause damage to the wheel to which the stump cutter teeth are mounted. Further, the bore in the pocket, which carries the stump cutter tooth, may elongate in cross-section due to wear over time so as to be detrimental to the overall cutting process. The time and expense connected with the replacement of the pocket or components thereof also reduces the overall operational efficiency of the stump cutter apparatus. It would be advantageous to provide an improved stump cutter tooth assembly (including the pocket and associated components) that experiences a reduction in events (e.g., the breakage or wear) that require replacement of the other components of the stump cutter tooth assembly including without limitation the pocket and associated fasteners.

It is inevitable that a stump cutter tooth, as well as other components of the stump cutter tooth assembly, will eventually break or wear past a point of usefulness to require replacement with another stump cutter tooth or pocket. This being the case, it would be highly desirable to provide an improved stump cutter tooth, as well as an assembly (including a pocket) that uses the improved stump cutter tooth, that enhances the operational efficiencies connected with replacement of stump cutter teeth or other components of the stump cutter assembly.

SUMMARY OF THE INVENTION

In one form thereof, the invention is a stump cutter tooth held by a pocket member, which has a first edge and a second edge, wherein the pocket member is operatively attached to a driven wheel, which has opposite first and second side surfaces. The stump cutter tooth comprises an elongate tooth body that has an axial forward end, a first hard region that is at the axial forward end of the tooth body and defines at least one distinct cutting edge that has an orientation to engage the stump during operation of the driven wheel. The stump cutter tooth has a second hard region that is at the axial forward end of the tooth body. The second hard region is distinct from the first hard region, and the second hard region provides protection to at least a portion of the pocket member.

In another form thereof, the invention is a bi-directional pocket member for retaining a stump cutter tooth wherein the pocket is affixed to a selected wheel side surface of a driven wheel that has a first wheel side surface and a second wheel side surface. The pocket member comprises a pocket body that has a first pocket edge, a second pocket edge, a first pocket side surface, a second pocket side surface, a radial inward pocket portion and an integral radial outward pocket portion. The radial inward pocket portion contains attachment bores used to operatively attach the pocket member to the driven wheel. The radial outward portion contains a retention bore used to retain the stump cutter tooth.

In yet another form thereof, the invention is a stump cutter tooth assembly for operative attachment to a driven wheel that has a first wheel side surface and a second wheel side surface. The stump cutter tooth assembly comprises a stump cutter tooth and a bi-directional pocket member wherein the bi-directional pocket member rotatably retains the stump cutter tooth. The bi-directional pocket member is operatively attached to a selected one of the first and second wheel side surface. The pocket body has a first pocket edge, a second pocket edge, a first pocket side surface, a second pocket side surface, a radial inward pocket portion and an integral radial outward pocket portion. The radial inward pocket portion contains attachment bores used to operatively attach the pocket member to the driven wheel. The radial outward portion contains a retention bore used to non-rotatably retain the stump cutter tooth. The stump cutter tooth comprises an elongate tooth body that has an axial forward end. A first hard region is at the axial forward end of the tooth body and defines at least one distinct cutting edge that has an orientation to engage the stump during operation of the driven wheel. A second hard region is at the axial forward end of the tooth body. The second hard region is distinct from the first hard region and provides protection to at least a portion of the pocket member.

In another form thereof, the invention is a stump cutter assembly that includes a driven wheel that has a first wheel side surface and a second wheel side surface. There is a first stump cutter tooth assembly for operative attachment to the first wheel side surface and a second stump cutter tooth assembly for operative attachment to the second wheel side surface. The first stump cutter tooth assembly comprises a first stump cutter tooth and a first bi-directional pocket member wherein the first bi-directional pocket member non-rotatably retains the first stump cutter tooth. The second stump cutter tooth assembly comprises a second stump cutter tooth and a second bi-directional pocket member, wherein the second bi-directional pocket member non-rotatably retains the second stump cutter tooth. The first stump cutter tooth assembly is in general transverse alignment with the second stump cutter tooth assembly.

In one form thereof, the invention is a stump cutter assembly that comprises a frame and a cutting wheel operably rotatably attached to the frame about a first axis. The cutting wheel has a radially outer portion, a first side and a second side. The stump cutter assembly further includes a pocket member that has a first position operatively attached to the first side of the cutting wheel wherein the pocket member has a radial inner portion, and a radial outer portion. One side of the pocket member faces the first side of the cutting wheel in the first position thereof and the other side of the pocket member faces away from the first side of the cutting wheel in the first position of the pocket member with respect to the cutting wheel. The pocket member also has a first edge and a second edge. There is a first shoulder disposed on the first edge of the pocket member, and a second shoulder disposed on the second edge of the pocket member. A bore is disposed in the radial outer portion of the pocket member radially outwardly from the first and second shoulders. The stump cutter assembly further includes a stump cutter tooth that has an elongated portion disposed in the bore of the pocket member in a first position thereof with respect to the pocket member. The stump cutter tooth has a first portion wherein a first edge thereof extends radially outwardly at least as far as the radial outer portion of the pocket member for shielding the radial outer portion of the pocket member from excessive wear when the cutting wheel is rotating in one direction. The first edge also extends radially inwardly in front of the first shoulder for shielding the front shoulder from excessive wear when the pocket member is on the first side of the cutting wheel and the cutting wheel is rotating in said one direction. There are a first and a second abutment surface on the stump cutter tooth. The first abutment surface is disposed behind the first edge of the stump cutter tooth when the cutting wheel is rotating in said one direction. The first abutment surface is in operative engagement with the first shoulder of the pocket member to prevent rotation of the stump cutter tooth with respect to the pocket member. The pocket member has a second position disposed on and operatively attached to the second side of the cutting wheel. The stump cutter tooth has a second position with respect to the pocket member when the pocket member is in the second position thereof with respect to the cutting wheel. The second abutment surface of the stump cutter tooth is in contact with the second shoulder of the pocket member whereby the leading edge of the stump cutter tooth is reversed and thereby shields the second edge of the pocket member and the second shoulder of the pocket member from wear.

In another form thereof, the invention is a stump cutting tool assembly for a stump cutting apparatus that has a rotatable cutting wheel with an outer periphery. The stump cutting tool assembly comprises a tool holder operatively removably attached to the cutting wheel. The tool holder comprises a wheel portion that extends circumferentially adjacent the outer periphery cutting wheel and a tool portion disposed at least partially radially outwardly from the wheel portion wherein the tool portion has an aperture disposed therein. The stump cutting tool assembly further includes a cutting tooth operatively removably attached to the tool holder. The cutting tooth has an unobstructed front face and a shank attached to the front face and extending rearwardly from the front face. The shank is disposed at least partially in the aperture of the tool holder. The front face of the cutting tooth has a first hardened portion and a separate second hardened portion whereby chipping of one of the first or second hardened portions does not immediately cause chip damage to the other of the first or second hardened portions of the front face due to the non-continuous nature of using separate first and second hardened portions instead of using one continuous unobstructed front face.

BRIEF DESCRIPTION OF THE DRAWINGS

The following is a brief description of the drawing figures that form a part of this patent application:

FIG. 6 is a side view of a specific embodiment of a cross-over pocket member, which attaches to a side surface of the driven cutting wheel, that retains a stump cutter tooth;

FIG. 7 is a view of one edge of the cross-over pocket member of FIG. 6;

FIG. 8 is a view of the other edge of the cross-over pocket member of FIG. 6;

FIG. 9 is a cross-sectional view of the cross-over pocket member taken along section line 9-9 of FIG. 8;

FIG. 10 is a cross-sectional view of the cross-over pocket member taken along section line 10-10 of FIG. 9;

FIG. 13 is a side view of the offset pocket member of FIG. 12;

FIG. 14 is a view of one edge of the offset pocket member of FIG. 13;

FIG. 15 is a view from the other edge of the offset pocket member of FIG. 13;

FIG. 16 is a cross-sectional view of the offset pocket member taken along section line 16-16 of FIG. 13;

FIG. 17 is a cross-sectional view of the offset pocket member taken along section line 17-17 of FIG. 14;

FIG. 27 is a side view of another specific embodiment of a stump cutter tooth of the invention wherein the stump cutter tooth has three separate hard inserts affixed to the axial forward end thereof;

FIG. 28 is a front view of the stump cutter tooth of FIG. 27;

FIG. 29 is an isometric view of another specific embodiment of a stump cutter tooth of the invention wherein the single monolithic hard insert presents three separate cutting edges;

FIG. 30 is a front view of the stump cutter tooth of FIG. 29;

DETAILED DESCRIPTION

Figure 1:
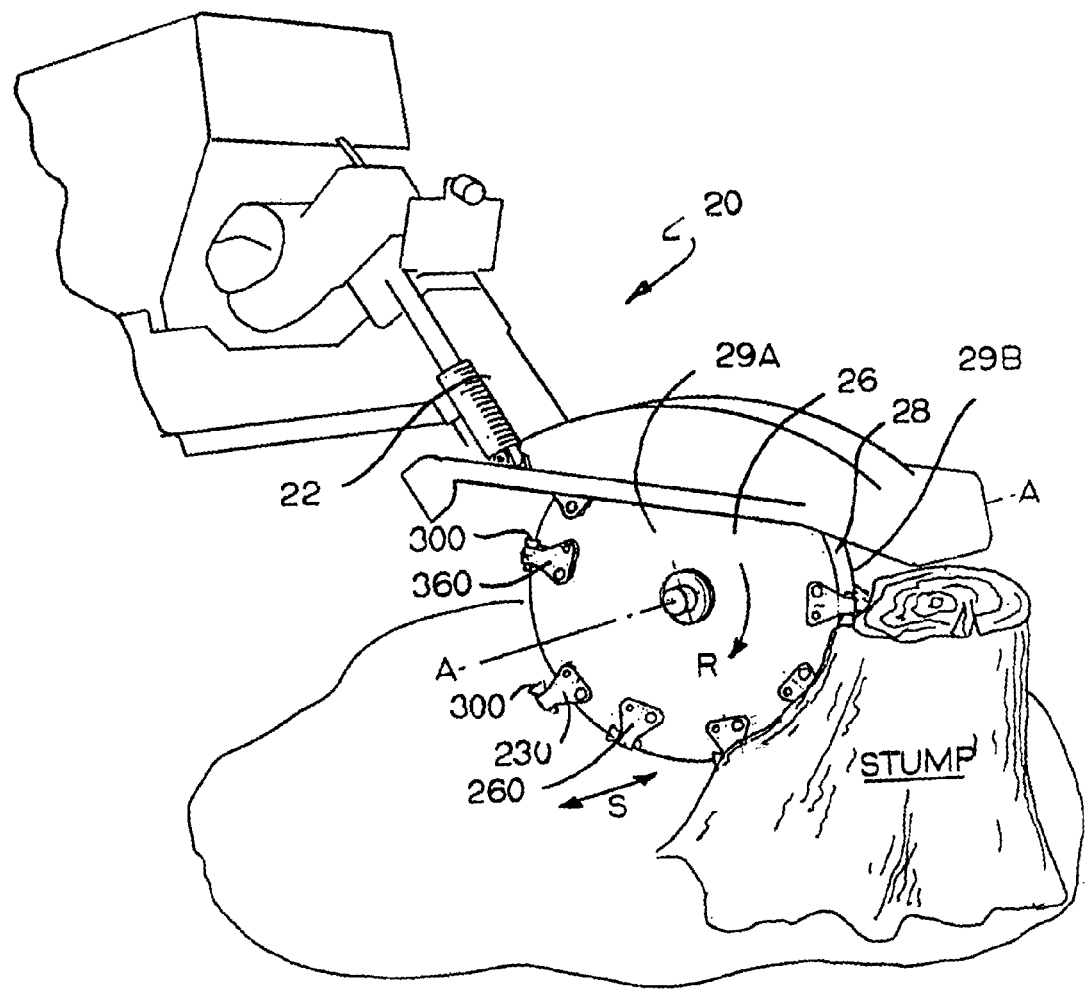
FIG. 1 is an isometric view of a stump cutter assembly in engagement with a stump wherein the pocket members and stump cutter teeth as disclosed in the present patent application are used with this stump cutter assembly.

Referring to the drawings, in FIG. 1 there is illustrated a stump cutter assembly (generally designated as 20) that is in engagement with a stump (designated as "STUMP"). Stump cutter assembly 20 uses the stump cutter tooth assemblies (e.g., stump cutter teeth and pockets) shown and described in this patent application. This particular stump cutter assembly (or stump cutter machine) is a Vermeer SC352 stump cutter made and sold by Vermeer Mfg. Co., 1210 Vermeer Road East, Pella, Iowa 50219. However, there is no intention to limit or restrict the scope of the invention to any specific type or kind of stump cutter assembly.

Figure 2:
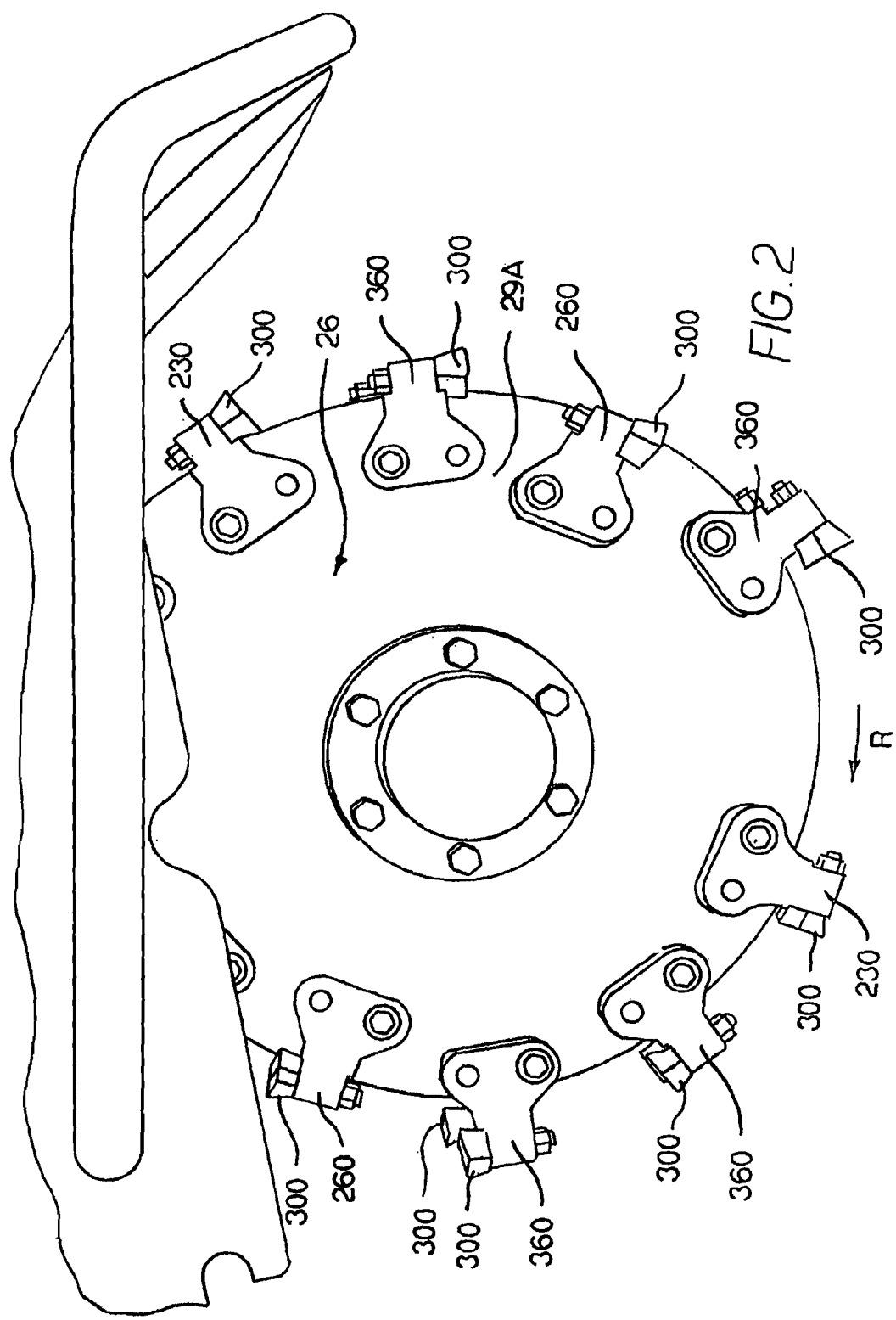
FIG. 2 is an isometric view of the forward portion of the stump cutter assembly of FIG. 1 illustrating a plurality of stump cutter tooth assemblies mounted (or operatively attached) to the driven cutting wheel.

Still referring to FIG. 1, stump cutter assembly 20 has an arm (or frame) 22 with a distal end and to which is operatively rotatably attached a driven cutting wheel 26 about a first axis A-A. Driven cutting wheel 26 has a circumferential (or peripheral) edge 28 and a radial outer portion that has its radial outer termination at the circumferential edge. Driven cutting wheel 26 has opposite side surfaces that comprise a first side surface 29A and a second side surface 29B. A plurality of stump cutter tooth assemblies is affixed to the cutting wheel 26 in the vicinity of the peripheral edge 28 of the driven wheel. FIG. 2 shows the forward portion of the stump cutter assembly of FIG. 1 wherein a plurality of stump cutter tooth assemblies are mounted to the driven wheel.

A stump cutter tooth assembly comprises a stump cutter tooth and a pocket member that affixes (or is operatively attached) to one or the other of side surfaces (i.e., a first side surface 29A or a second side surface 29B) of the cutting wheel near the periphery thereof. As will be described in more detail hereinafter, there are three different styles of pocket members (i.e., a straight pocket, a cross-over pocket and an offset pocket). Each one of these styles or kinds of pocket members includes an extension (or radial outer portion that is reduced in both width and thickness as compared to the radial inner portion of the pocket member) that contains a bore. The stump cutter tooth is attached to the pocket member by positioning the shank of the stump cutter tooth in the bore and, at least for one specific embodiment of the stump cutter tooth, tightening a nut onto the threaded portion of the shank to secure the stump cutter tooth to the pocket member.

Figure 3:
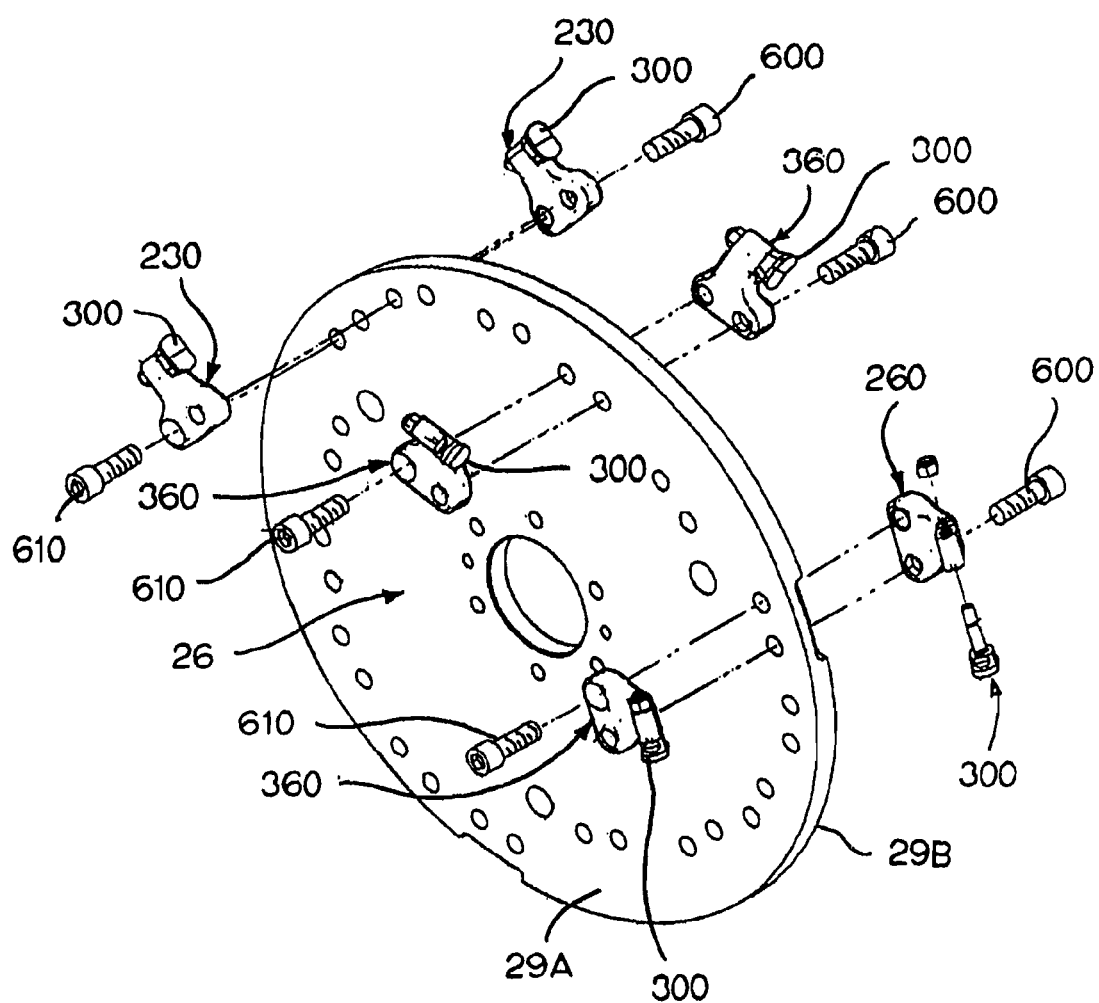
FIG. 3 is an isometric view of a driven cutting wheel with the components of several stump cutter tooth assemblies exploded away from the side surfaces (e.g., first side surface and second side surface) of the cutting wheel.
Figure 21:
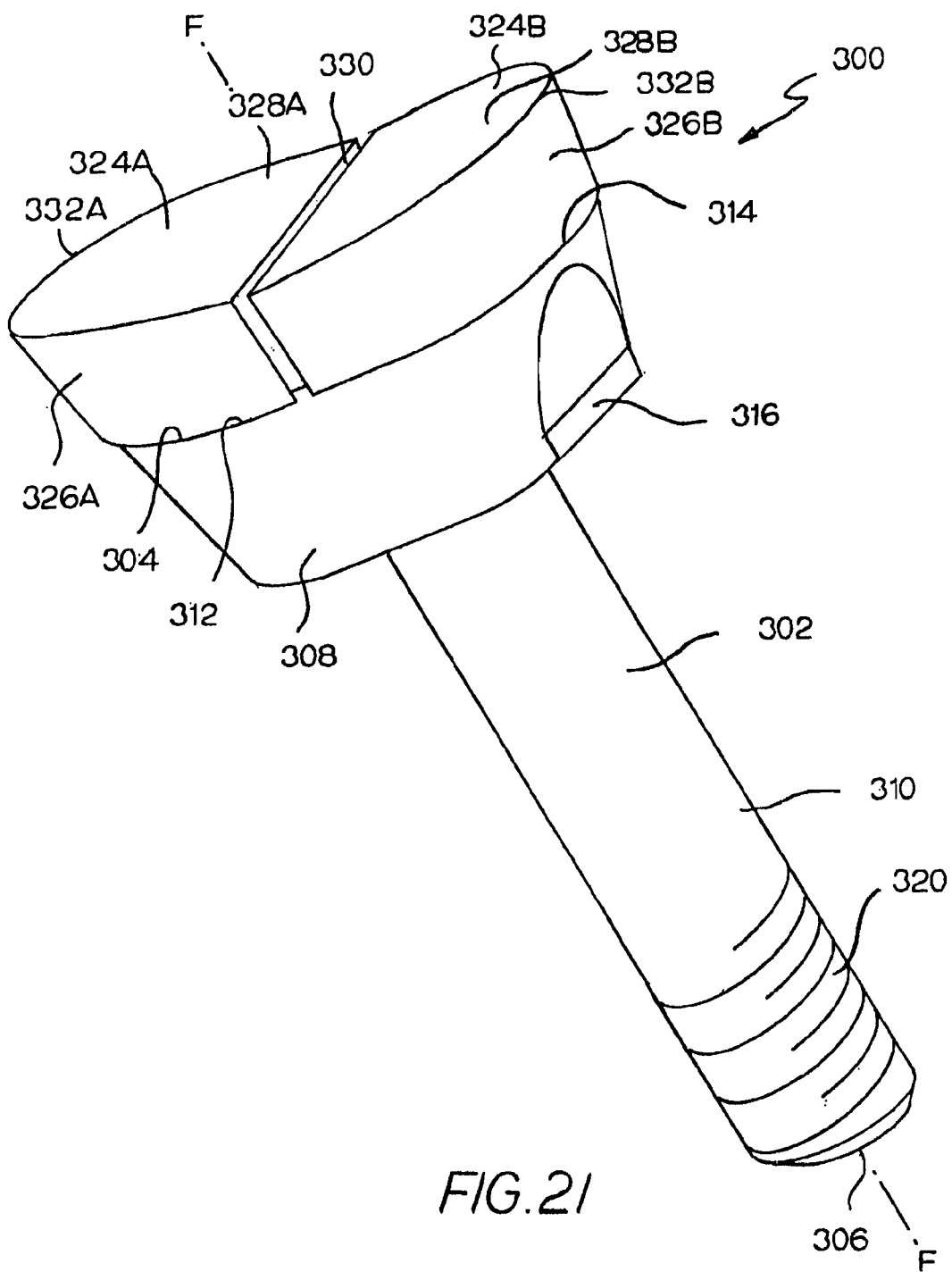
FIG. 21 is an isometric view of another specific embodiment of a stump cutter tooth (which is the preferred stump cutter tooth) wherein two separate hard inserts are affixed to the axial forward end of the stump cutter tooth and the axial rear end of the shank is threaded.

Referring to FIG. 3, there is illustrated in isometric fashion a driven cutting wheel 26 with selected ones of the components of a plurality of stump cutter assemblies exploded away. In this regard, FIG. 3 shows an offset pocket member 360 (which retains a stump cutter tooth) oppositely disposed from a straight pocket member 230 (each of which retains a stump cutter tooth 300) exploded away from each one of the side surfaces (first side surface 29A and second side surface 29B) of the cutting wheel. FIG. 3 also shows a pair of oppositely disposed cross-over pocket members 260 (each of which retains a stump cutter tooth 300) exploded away from each one of the side surfaces (29A, 29B) of the cutting wheel. FIG. 3 further shows a pair of oppositely disposed offset pocket members 360 (each of which retains a stump cutter tooth 300) exploded away from each one of the side surfaces (29A, 29B) of the cutting wheel. Stump cutter tooth 300 is shown in FIG. 21 and is described in more detail hereinafter.

As is known by those of ordinary skill in the pertinent art, the stump cutter is positioned near the stump, and then the wheel is driven (or rotated) (see directional arrow "R" in FIG. 1) and then moved in a radial sweeping motion (see directional arrow "S" in FIG. 1) whereby the stump cutter teeth impinge the stump. After having made a number of cuts or passes into the stump, the result is that the stump has been disintegrated below the surface of the ground. As mentioned hereinabove, United States patent documents that disclose a stump cutter include U.S. Pat. No. 6,024,143 to Ritchey for a CUTTING TOOTH ASSEMBLY, U.S. Pat. No. 5,497,815 to Bowling for a CUTTING TOOTH, U.S. Pat. No. 5,743,314 to Puch for a STUMP CUTTING TOOL ASSEMBLY, and U.S. Pat. No. 4,998,574 to Beach for a CUTTING BIT AND BLOCK MOUNT. Each one of the above patents is hereby incorporated by reference herein.

Figure 4:
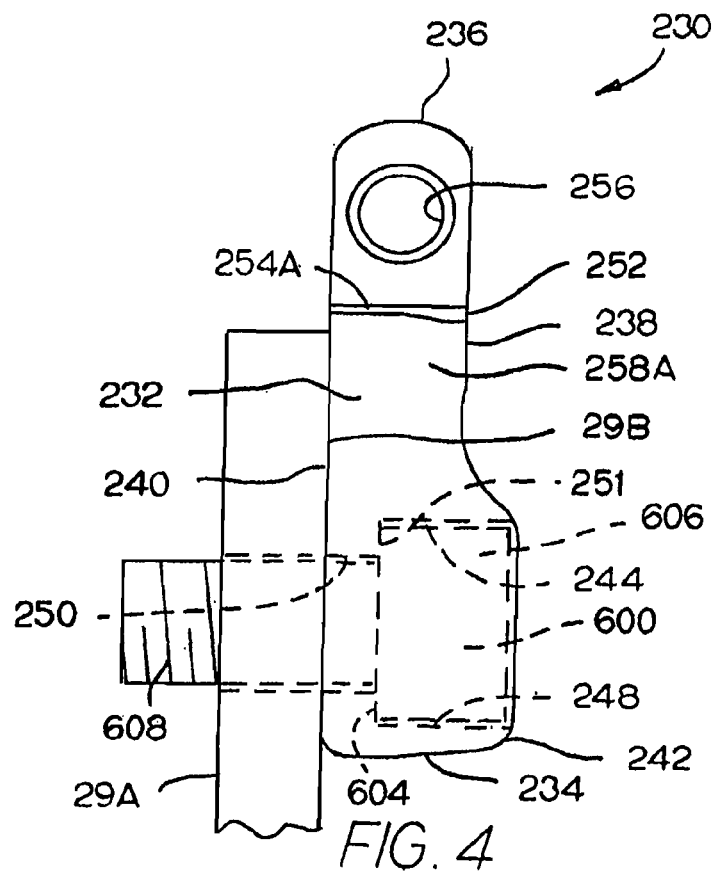
FIG. 4 is a view of one edge of a straight pocket member such as illustrated in FIG. 3.
Figure 5:
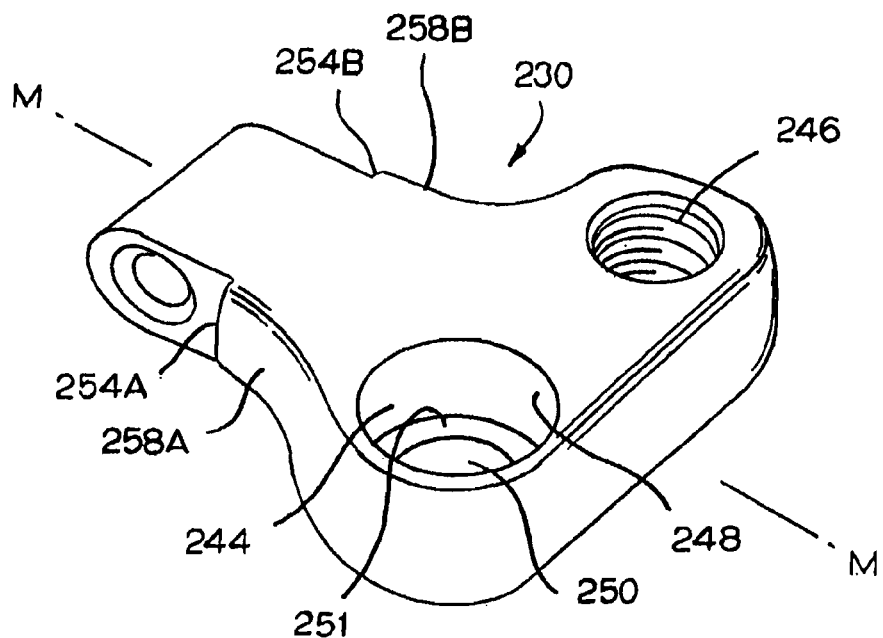
FIG. 5 is an isometric view of the straight pocket member as illustrated in FIG. 4.
Figure 5A:
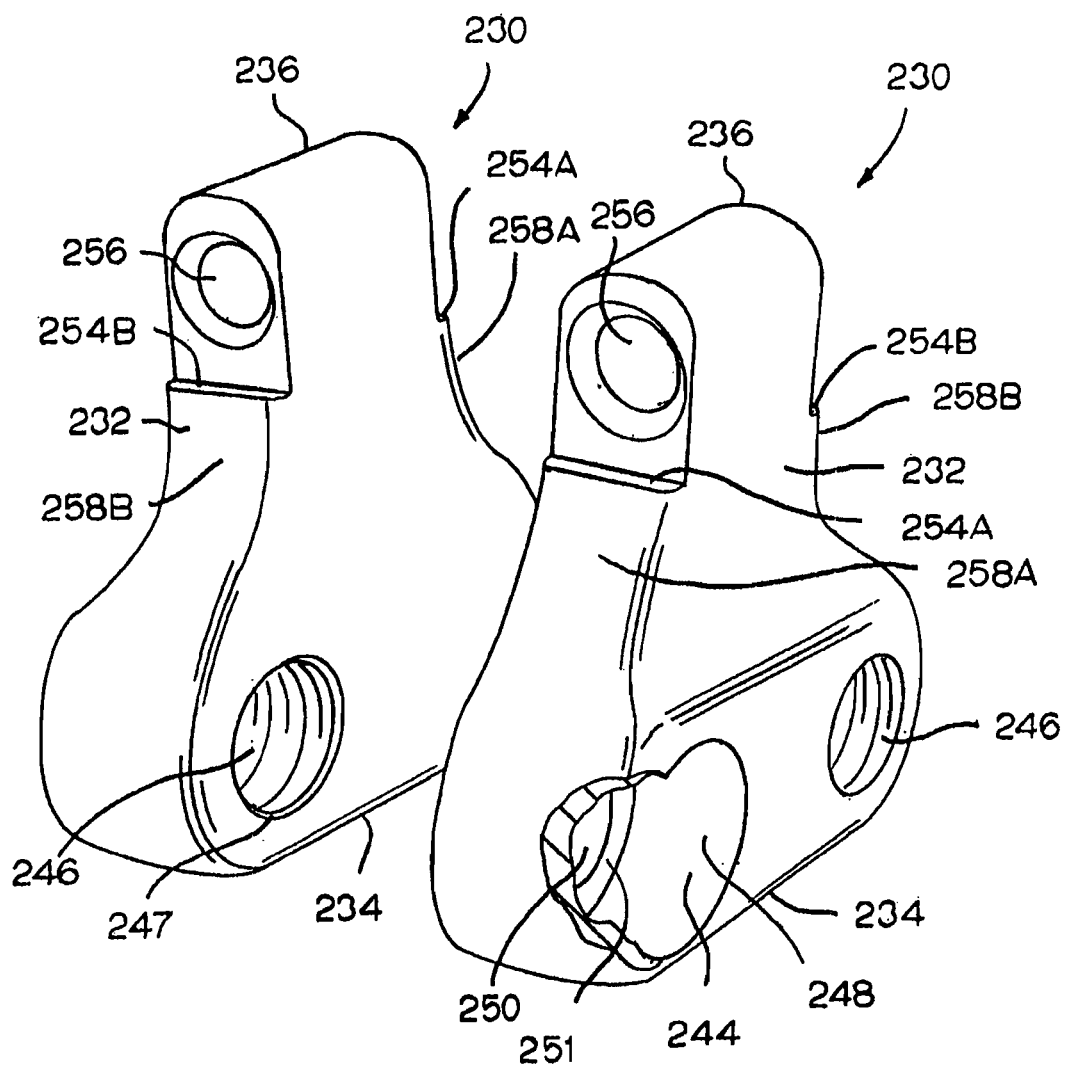
FIG. 5A is an isometric view of a pair of spaced-apart, oppositely disposed straight pocket members showing their position relative to one another when mounted (or operatively attached) opposite each other on a cutting wheel.
Figure 11:
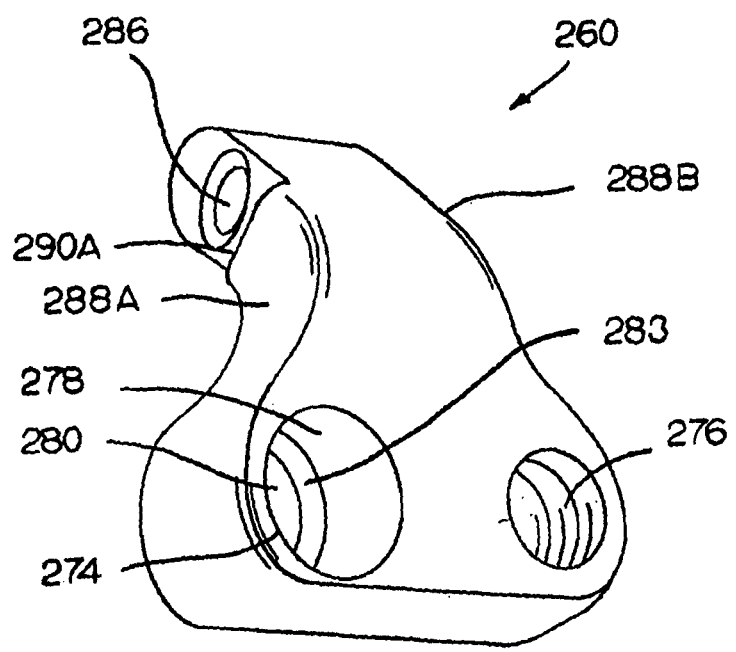
FIG. 11 is an isometric view of a cross-over pocket member.
Figure 12:
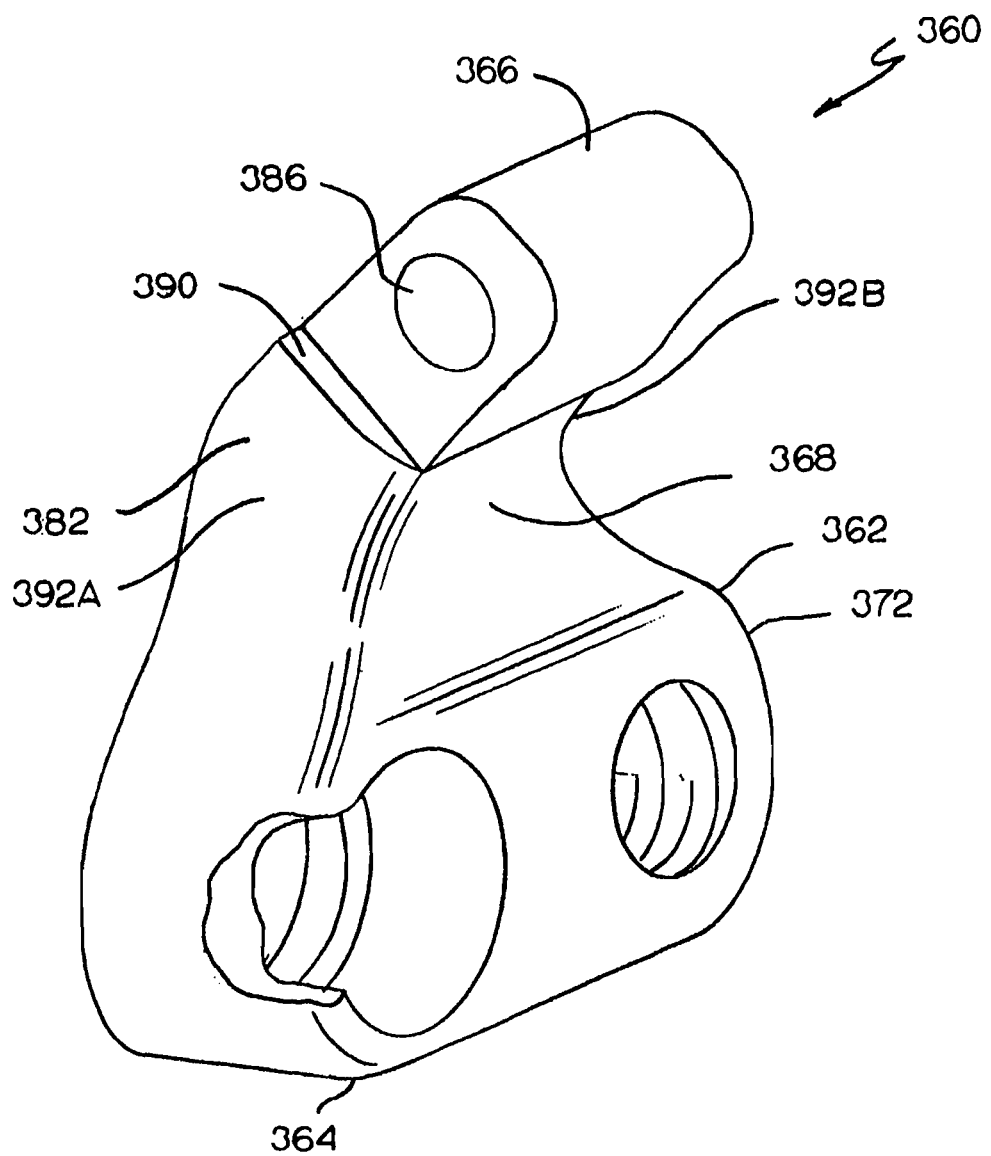
FIG. 12 is an isometric view of an offset pocket member.

Referring to FIGS. 4, 5 and 5A, one of the styles of the pocket members used to hold a stump cutter tooth is a straight pocket generally designated as 230 and which is illustrated in FIGS. 4, 5 and 5A. Straight pocket 230 includes a body 232 that has a radial inner end 234 and a radial outer end 236. Pocket body 232 also has an outer side surface 238 and an opposite inner side surface 240. When the pocket 230 is securely affixed to the driven cutting wheel, the inner side surface 240 is pressed against a selected one of the side surfaces of the cutting wheel 26.

Pocket body 232 has an enlarged (or base) portion 242 adjacent to the radial inner end 234 thereof. Pocket body 232 further includes a reduced portion 252 that extends from and is integral with the base portion 242. As can be seen from FIG. 4, base 242 has an enlarged thickness and width as compared to the rest of the cutter body (i.e., the reduced portion). The enlarged portion 242 contains a pair of bores 244 and 246 therein. As illustrated in FIGS. 4, 5 and 5A, bore 244 is a smooth bore that includes an enlarged counterbore portion (that has an enlarged diameter) section 248 and a reduced diameter section 250. A shoulder 251 provides a transition between the enlarged counterbore portion 248 and the reduced diameter portion 250 of the bore. Bore 246 is a threaded bore wherein the threaded portion is of a generally constant diameter. Bore 246 has a frusto-conical portion 247 at the one end thereof adjacent to the inner side surface 240. The assembly or fastening of the straight pocket to the cutting wheel will be described hereinafter.

The straight pocket member 232 has opposite edges 258A and 258B. Reduced portion 252 contains a bore 256 that passes between the opposite edges 258A and 258B thereof. Although it will be described in more detail hereinafter, a stump cutter tooth is positioned within the bore 256 and is then retained therein.

A shoulder 254A and 254B is on each one of the opposite edge surfaces (258A and 258B, respectively) at a location near where the pocket body transitions between the base portion and the reduced portion. Shoulder 254A corresponds to first edge 258A and shoulder 254B corresponds to second edge 258B. Again, although it will be described in more detail hereinafter, when attached to the straight pocket member, a stump cutter tooth engages a selected one of the shoulders to help keep the stump cutter tooth from rotating during the stump cutting operation. It can be said that the shoulder 254 functions as an abutment or a stop with respect to the stump cutter tooth.

It should be appreciated that each one of the shoulders (254A and 254B) is spaced apart from the bore 256 a distance that is sufficient to permit the operator to use a wrench (or other tool) to easily tighten or loosen the nut that secures the stump cutter tooth to the pocket. Easy access to the nut increases the serviceability and reduces downtime connected with the operation of the stump cutter.

FIG. 5A is an isometric view of a pair of the straight pockets 230 spaced apart from one another in a fashion that represents the relative orientation between these straight pockets 230 when attached to the driven cutting wheel 26. In this regard, FIG. 3 shows (although in an exploded condition) where a pair of oppositely disposed straight pocket members 230 is operatively attached to the cutting wheel.

Figure 18:
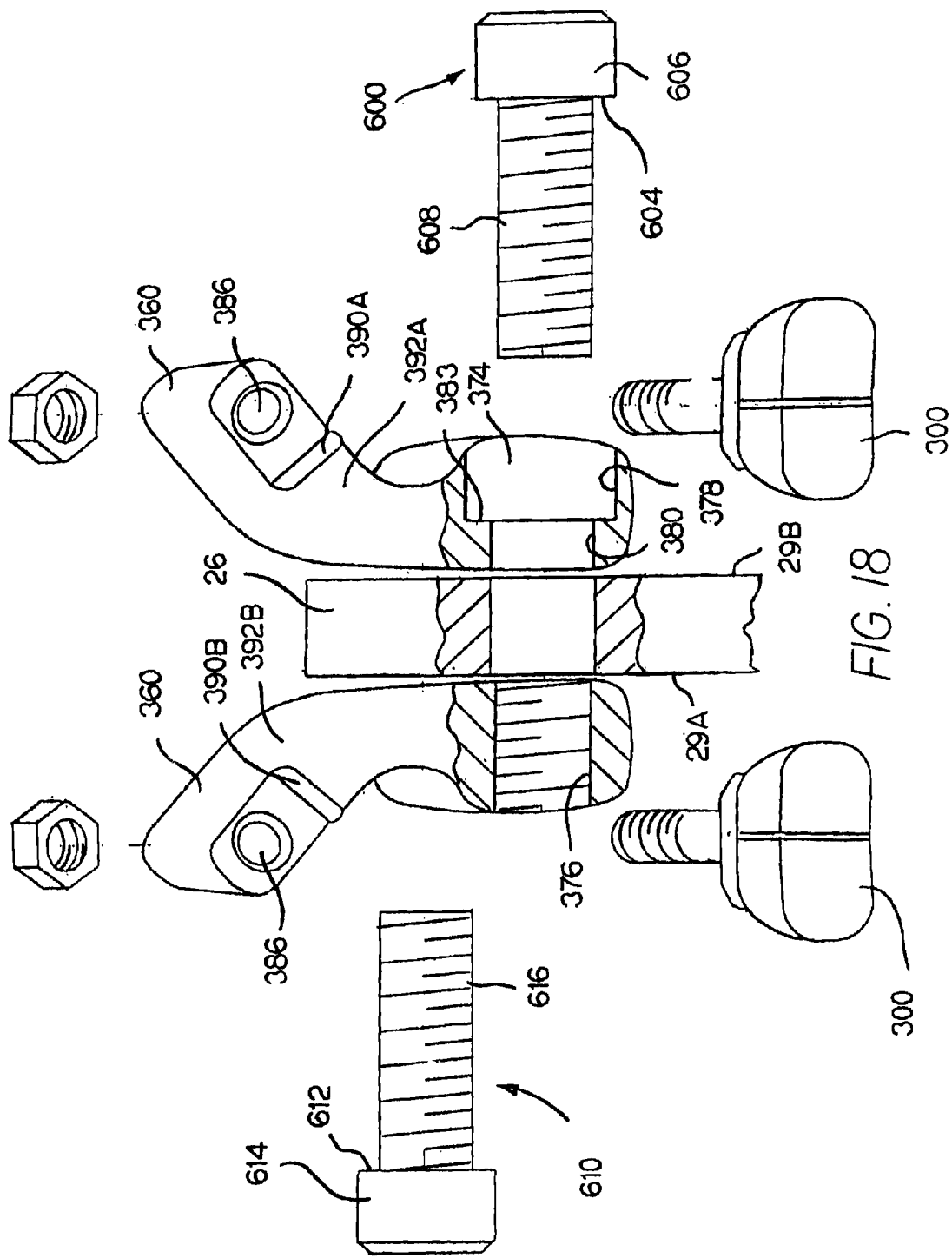
FIG. 18 is an isometric view that shows the components of a stump cutter assembly exploded apart from one another in relation to a driven cutting wheel wherein these components comprise a pair of oppositely disposed offset pocket members, a pair of cap screws, a stump cutter tooth (the embodiment of FIG. 21) for each one of the offset pocket members and a nut used to secure each stump cutter tooth to its respective one of the offset pocket members.

In regard to the attachment of the straight pockets 230 to the first side surface 29A and the second side surface 29B of the cutting wheel 26, these straight pocket members 230 are attached to the cutting wheel 26 in a fashion like that for the offset pockets as shown in FIG. 18. Keeping in mind the description of the attachment of the offset pocket members set forth hereinafter, when the straight pocket members 230 are positioned relative to the cutting wheel 26 as shown in FIG. 3 and relative to each other as shown in FIG. 5A, one cap screw 600 passes through the smooth bore 244 and through a corresponding aperture in the cutting wheel so as to engage the threaded bore 246 in the opposite pocket member 230. The shoulder of the cap screw 600 that provides a transition between the head and the threaded shank abuts against the corresponding shoulder 251 and the threaded shank threadedly engages the threaded bore 246. The same operation is done for cap screw 610, except that it passes through the smooth bore of the opposite straight pocket member and through the corresponding aperture in the cutting wheel and into threaded engagement with the threaded bore in the opposite pocket member 230. Each one of the cap screws (600, 610) is securely tightened so as to firmly and securely attach the straight pocket member to the driven cutting wheel.

Although it will be discussed in more detail hereinafter, the cap screws used to secure any one of the kinds of pockets to the wheel are typically tightened to a greater torque than for the nuts used to attach the stump cutter teeth to the pockets. Since the stump cutter teeth are tightened to a lesser torque than the pocket bolts, it is easier to detach the stump cutter teeth from their respective pockets than to detach the pockets from the wheel. Thus, the ability to replace the stump cutter tooth by detaching only the tooth as opposed to the entire pocket, comprises an advantage that reduces downtime.

It should be appreciated that the straight pocket 230 is bi-directional in the sense that it can be positioned and reattached to the opposite side surface of the wheel. This becomes especially important in the event the forward face or one of the edges of the pocket 230 becomes damaged during use. If this occurs, the pocket 230 can be removed from the wheel, rotated 180 degrees about the axis M-M (see FIG. 5) and moved to the other side of the wheel. By doing this, the previously forward face (which was damaged) becomes the rearward face and the previously rearward face becomes the forward face. In order for this to be the case, the reduced portion 252 (or most of the reduced portion) of the pocket is symmetrical about the central axis M-M as shown in FIG. 5. The corresponding opposite straight pocket also has to be switched to its opposite side of the wheel. This bi-directional feature allows for the easy and quick reuse of a damaged pocket.

The bi-directional feature can be shown through the orientation of the pockets 230 in FIG. 5A. One can consider that the straight pocket 230 on the left side as viewed in FIG. 5A is attached to the cutting wheel with a stump cutter tooth retained thereby and rotated in such a direction that the left face is the forward face or edge 258B. In such an orientation, the edge 258B experiences the greatest extent of wear, as compared to the rearward face or edge 258A, due to impingement of cutting debris thereon. What this means is that the rearward face or edge 258A would typically not experience much wear due to the impingement from the uncut stump and/or the cutting debris as does the forward edge 258B.

Figure 22:
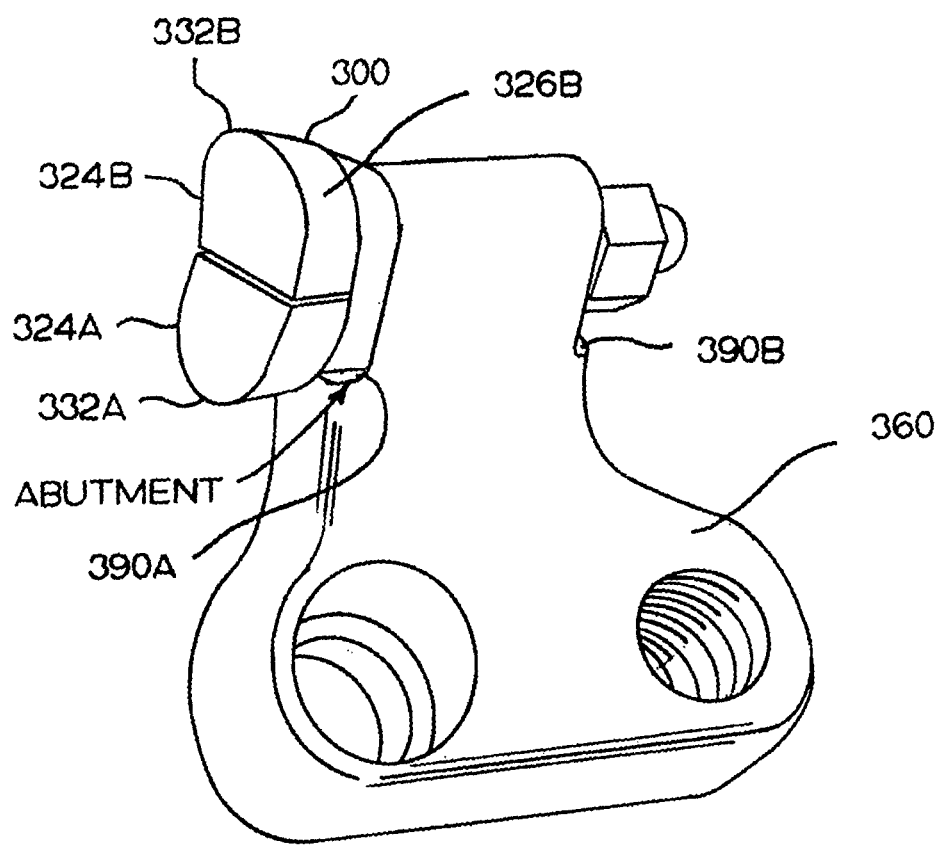
FIG. 22 is an isometric view of the stump cutter tooth of FIG. 21 retained by the offset pocket such as that shown in FIG. 12.

Further, it should be appreciated that when the stump cutter tooth is mounted in the bore 256 of the pocket 230, the cutting insert that is not in direct engagement with the stump helps protect the edge 258A and the shoulder 254A from wear due to impingement. The orientation of the stump cutter tooth 300 in the offset pocket member 360 as illustrated in FIG. 22 is representative of the pocket 230 carrying a stump cutter tooth.

On occasion the edge 258B (or shoulder 254B) may suffer damage such that the pocket no longer functions in a useful (or optimum) fashion. In this embodiment, rather than replace the straight pocket 230 with a new straight pocket, the operator can remove the partially damaged (or worn) straight pocket and reposition it on the other side of the wheel so as to have an orientation like that of the right hand (as viewed in FIG. 5A) straight pocket. After being repositioned, it can be seen that the previous forward face (edge 258B which was damaged or worn) becomes the rearward face and the previous rearward face (edge 258A) becomes the forward face that experiences most of the impingement of the cutting debris. The corresponding opposite straight pocket also has to be switched to its opposite side of the wheel so that the bores correspond to one another (i.e., a bore with the counter bore in one pocket must correspond to a threaded bore of the other pocket). Although it will be mentioned hereinafter, it should be appreciated that the other pockets (i.e., the cross-over pocket and the offset pocket) disclosed hereinafter also have the bi-directional capability wherein the bi-directional capability of the pockets enhances the serviceability of the stump cutter assembly and reduces downtime for the stump cutter assembly.

Another kind of the pocket members is a cross-over pocket generally designated as 260 and is shown in FIGS. 6 through 12. Cross-over pocket 260 includes a body 262 that has a radial inner end 264 and a radial outer end 266. Pocket body 262 also has an outer side surface 268 and an inner side surface 270. When the pocket 260 is securely affixed to the driven wheel, the inner side surface 270 is adjacent to and pressed against either the first side surface 29A or the second side surface 29B of the cutting wheel.

Pocket body 262 has an enlarged (or base) portion 272 adjacent to the radial inner end 264 thereof. Pocket 262 further includes an angled (reduced dimension) portion 282 that extends from and is integral with the base portion 272. As can be seen in FIGS. 6 through 8, base 272 has an enlarged thickness and width as compared to the rest of the cutter body (i.e., the reduced portion 282). The base 272 contains a pair of bores 274 and 276 therein. Bore 274 includes a counterbore (enlarged diameter) section 278 and a reduced diameter section 280. There is a shoulder 283 at the joinder of the counterbore portion 278 and the reduced diameter bore portion 280. Bore 276 is a threaded bore that is of a constant diameter except for a frusto-conical mouth 281 adjacent to the inner side surface thereof.

The cross-over pocket member 260 has opposite edges 288A and 288B. Angled portion 282 contains a bore 286, which has opposite frusto-conical mouths, that passes between the front surface and the rear surface (or between the opposite edges 288A and 288B, i.e., a first edge and a second edge) of the pocket 260. Although it will be described hereinafter, the stump cutter tooth is positioned within the bore 286 and is retained therein.

There are opposite shoulders (or abutments) 290A and 290B at a location near where the pocket body transitions between the base portion and the reduced portion. Shoulders 290A and 290B correspond to opposite edges 288A and 288B, respectively. Again, although it will be described in more detail hereinafter, the stump cutter tooth engages a selected one of the shoulders (290A and 290B) to help keep the stump cutter tooth from rotating during the stump cutting operation.

In regard to the attachment of the cross-over pockets 260 to the first side surface 29A and the second side surface 29B of the cutting wheel 26, these cross-over pocket members 260 are attached to the cutting wheel 26 in a fashion like that for the offset pockets as shown in FIG. 18 or for the straight pockets 230 as described above. When the cross-over pocket members are positioned relative to the cutting wheel 26 as shown in FIG. 3 and relative to each other as shown in FIG. 5A, one cap screw 600 passes through the smooth bore and through a corresponding aperture in the cutting wheel so as to engage the threaded bore in the opposite cross-over pocket member. The shoulder of the cap screw 600 that provides a transition between the head and the threaded shank abuts against the corresponding shoulder and the threaded shank threadedly engages the threaded bore. The same operation is done for cap screw 610, except that it passes through the smooth bore of the opposite straight pocket member and through the corresponding aperture in the cutting wheel and into threaded engagement with the threaded bore in the opposite cross-over pocket member. Each one of the cap screws (600, 610) is securely tightened so as to firmly and securely attach the cross-over pocket member or its mating (or corresponding) pocket member to the driven cutting wheel.

It should be appreciated that a cross-over pocket 260 is typically used in conjunction with an offset pocket member 360 or a straight pocket member 230. However, in an instance where the wheel is very thick, two cross-over pockets 260 may be used in conjunction with one another.

As mentioned above, the cross-over pocket 260 is also bi-directional as shown in FIGS. 7 and 8. In this regard, when the cross-over pocket 260 is attached to second side 29B of the cutting wheel 26 as shown in FIG. 8, the left hand (edge 288A) surface (as viewed in FIG. 6) of the cross-over pocket 260 experiences the greater extent of abrasive wear due to impingement by the stump and cutting debris as compared to the right hand edge 288B. Further, it should be appreciated that when the stump cutter tooth is mounted in the bore 286 of the pocket 260, the cutting insert that is not in direct engagement with the stump helps protect the edge 288A and the shoulder 290A from wear due to impingement. The orientation of the stump cutter tooth 300 in the offset pocket member 360 as illustrated in FIG. 22 is representative of the pocket 260 carrying a stump cutter tooth. Should edge 288A (or shoulder 290A) become damaged, the pocket 260 could be removed from the wheel and reattached on the first side surface 29A of the wheel as shown in FIG. 7. After reattachment, the edge 288B (right hand edge as viewed in FIG. 6) would become the leading surface and experience the most impingement by the stump and cutting debris.

The third type of pocket is an offset pocket member generally designated as 360 and is shown in FIGS. 12 through 18. Offset pocket 360 includes a body 362 that has a radial inner end 364 and a radial outer end 366. Pocket body 362 also has an outer side surface 368 and an inner side surface 370. When the pocket 360 is securely affixed to the driven cutting wheel 26, the inner side surface 370 is adjacent to and pressed against a selected one of the first or second side surfaces (29A, 29B) of the wheel 26.

Pocket body 362 has an enlarged (or base) portion 372 adjacent to the radial inner end 364 thereof. Pocket 362 further includes an angled (reduced dimension) portion 382 that extends from and is integral with the base portion 372. Base 372 has an enlarged thickness and width as compared to the rest of the cutter body (i.e., the reduced portion 382). The base 372 contains a pair of bores 374 and 376 therein. Bore 374 includes a counterbore (enlarged diameter) section 378 and a reduced diameter section 380. There is a shoulder 383 at the joinder of the counterbore portion 378 and the reduced diameter bore portion 380. Bore 376 is a threaded bore that is of a constant diameter except for a frusto-conical mouth 381 adjacent to the inner side surface 370 thereof.

Offset pocket 360 has opposite edges 392A and 392B. Angled portion 382 contains a bore 386, which has opposite frusto-conical mouths, that passes between the opposite edges 392A and 392B. Although it will be described hereinafter, the stump cutter tooth is positioned within the bore 386 and is retained therein. There are opposite shoulders (or abutments) 390A and 390B at a location near where the pocket body transitions between the base portion and the reduced portion. Again, although it will be described in more detail hereinafter, the stump cutter tooth engages a selected one of the shoulders 390A and 390B to help keep the stump cutter tooth from rotating during the stump cutting operation.

As mentioned above, the offset pocket 360 is also bi-directional as shown in FIGS. 13 through 15. In this regard, when the offset pocket 360 is attached to the second side surface 29B of the cutting wheel 26, the left hand (edge 392A as viewed in FIG. 13) of the cross-over pocket 360 experiences the greater extent of abrasive wear due to the impingement of the stump and cutting debris as compared to the right hand edge 392B. Further, it should be appreciated that when the stump cutter tooth is mounted in the bore 386 of the pocket 360, the cutting insert that is not in direct engagement with the stump helps protect the edge 392A and the shoulder 390A from wear due to impingement. The orientation of the stump cutter tooth 300 in the offset pocket member 360 is illustrated by FIG. 22. Should edge 392A (or abutment 390A) become damaged, the pocket 360 could be removed from the wheel and reattached on the other side of the wheel as shown in FIG. 14. After reattachment, the edge 392B (the right hand edge as viewed in FIG. 13) would become the leading surface and experience the most impingement by the stump and cutting debris.

Referring especially to FIG. 18, there is shown a pair of opposed offset pockets 360 with the stump cutter tooth 300 (of FIG. 21), which are adapted to be retained to each one of the offset pockets, shown exploded out of the bores 386. This pair of offset pockets is oriented apart from one another in a fashion that represents the relative orientation between the offset pockets 360 when operatively assembled to the driven cutting wheel 26 wherein a pair of cap screws (600, 610) passes through corresponding apertures (or holes) in the cutting wheel and engages the corresponding bores in the opposite offset pockets.

The description for cap screw 600 passing through smooth bore 374 and the aperture in the cutting wheel for threaded engagement with the threaded bore 376 of the opposing offset pocket member 360 applies to cap screw 610. As shown in FIG. 18, one cap screw 600 enters and passes through smooth bore 374. Cap screw 600 continues to pass through the aperture in the cutting wheel and into threaded bore 376. Cap screw 600 is tightened until the shoulder 604 of the cap screw 600 that provides a transition between the head 606 and the threaded shank 608 abuts against the corresponding shoulder 383 and the threaded shank 608 threadedly engages the threaded bore 376. Each one of the cap screws (600, 610) is securely tightened so as to firmly and securely attach each one of the offset pockets to the driven wheel.

As mentioned and described above, each one of the pockets (i.e., the straight pocket, the cross-over pocket and the offset pocket) is bi-directional. What this means is that for each type of pocket member, one side surface of the pocket member faces (and the other side faces away from the) one side surface (29A or 29B) of the cutting wheel when the pocket member is in a first position relative to the cutting wheel. The other side of the pocket member faces (and the one side faces away from the) other side surface of the cutting wheel when the pocket member is in a second position relative to the cutting wheel. The bi-directionality feature provides a number of advantages as described below.

One advantage is that the cost of manufacture of the pockets is lower than for pockets that are not bi-directional. In this regard, the steel body used for both the cross-over pockets and the offset pockets is the same. The difference between the cross-over pocket and the offset pocket resides in the machining of the bores. One does not have to have two different steel bodies to make these pockets, but instead, only has to have one such body. Manufacturing advantages connected with cost and inventory exist if only one raw part is necessary as compared to a situation in which two raw parts are necessary Another advantage connected with the bi-directionality concerns the amount of inventory a user must maintain to be able to replace pockets. In this regard, in a situation where there are three basic pockets (i.e., the straight pocket, the cross-over pocket and the offset pocket), the bi-directional capability of the pockets requires that only three pockets be kept in inventory. This is in comparison to keeping six different pockets (left and right hand straight pockets, left and right hand cross-over pocket and left and right hand offset pockets) wherein the pockets do not have a bi-directional capability.

Figure 19:
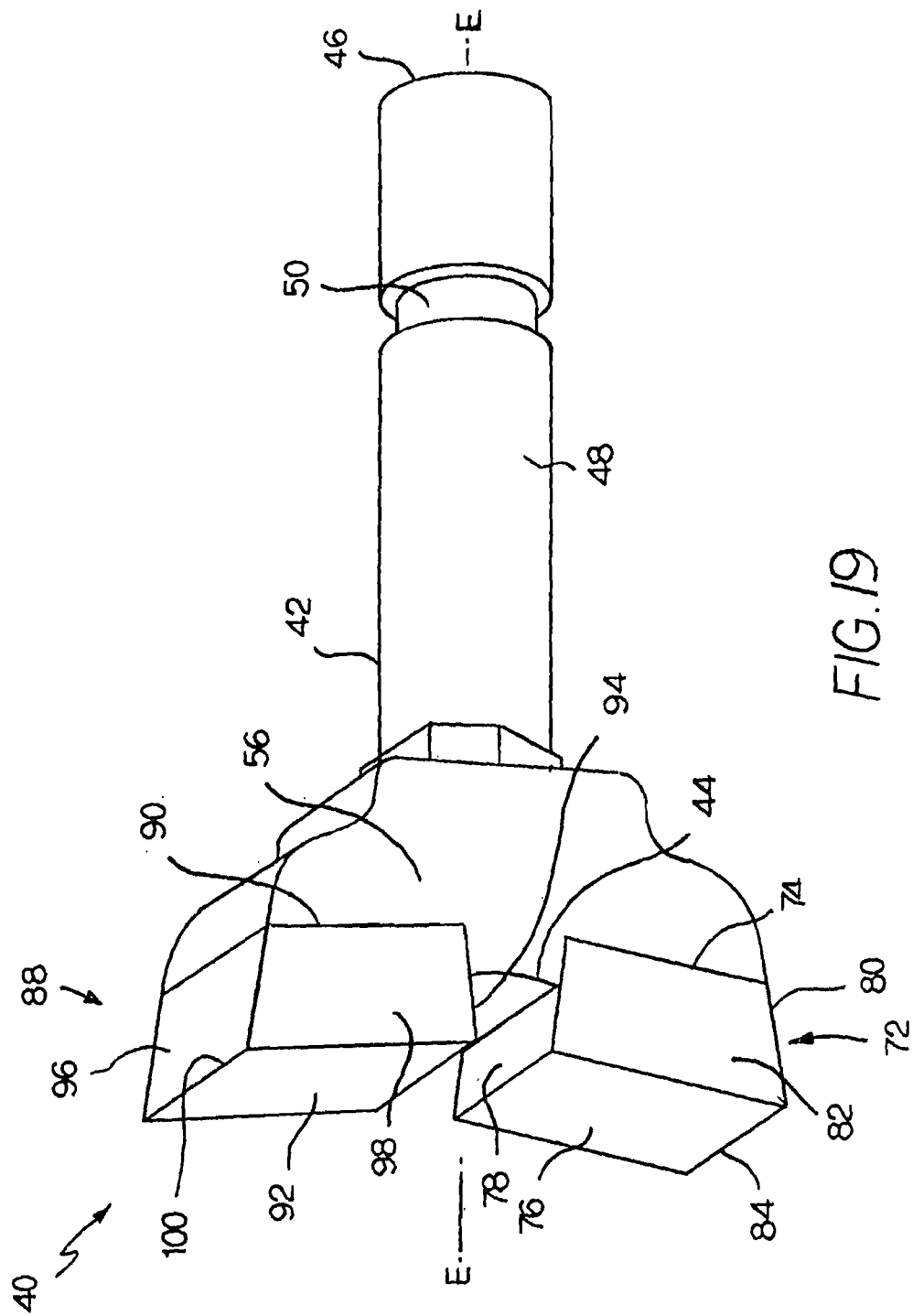
FIG. 19 is an isometric view of one specific embodiment of the stump cutter tooth of the invention wherein two separate hard inserts are affixed to the axial forward end of the stump cutter tooth.
Figure 20:
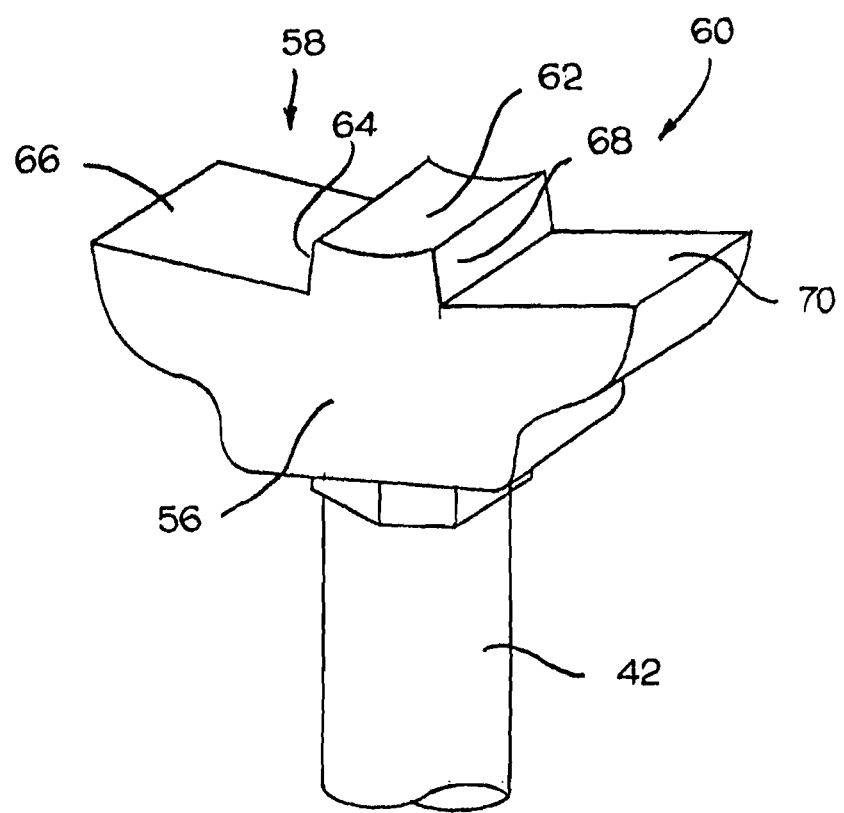
FIG. 20 is an isometric view of the axial forward end of the stump cutter tooth of FIG. 19 with the hard inserts removed.

Referring to FIGS. 19 and 20, there is shown a specific embodiment of the stump cutter tooth of the invention generally designated as 40. Stump cutter tooth 40 has an elongate cutter tooth body 42 that has an axial forward end 44 and an axial rearward end 46. The cutter tooth body 42 has a cylindrical shank 48 adjacent to the axial rearward end 46. The shank 48 contains a groove 50. When the stump cutter tooth 40 is within the bore of a supporting structure, a clip (not illustrated) engages the groove 50 to securely retain the stump cutter tooth 40 to the supporting structure such as, for example, supporting structure. Although the shank contains a groove, it should be appreciated that the axial rear end portion of the shank could be threaded (such as for the embodiment of FIG. 21) whereby a nut would be used to secure the stump cutter tooth to the pocket.

The cutter tooth body 42 has an enlarged head portion 56 at the axial forward end 44 thereof. The head portion 56 has a pair of spaced apart support faces 58 and 60 that are separated by a shoulder 62. As seen from FIG. 20, a generally vertical wall 64 and a generally horizontal wall 66 define support face 58, and a vertical wall 68 and a horizontal wall 70 define support face 60. Stump cutter tooth 40 further includes a pair of hard inserts (72, 88) affixed to the head portion 56.

Hard insert 72 has a bottom surface 74, a top surface 76, an inner surface 78, an outer surface 80 and opposite side surfaces 82. The hard insert 72 also has a primary cutting edge 84 at the juncture of the top surface 76 and the outer surface 80. The inner surface 78 is closer to the central longitudinal axis E-E of the cutter tooth body 40 than is the outer surface 80. Hard insert 72 is affixed to the support 58 (see FIG. 20) by brazing or the like wherein a portion of the inner surface 78 is adjacent to the vertical wall 64 and the bottom surface 74 is adjacent to the horizontal wall 66.

Hard insert 88 has a bottom surface 90, a top surface 92, an inner surface 94, an outer surface 96 and opposite side surfaces 98. The inner surface 94 is closer to the central longitudinal axis A-A of the cutter tooth body 40 than is the outer surface 96. The hard insert 88 also has a primary cutting edge 100 at the juncture of the top surface 92 and the outer surface 96. Hard insert 88 is affixed to the support face 60 by brazing or the like wherein a portion of the inner surface 94 is adjacent to the vertical wall 68 and the bottom surface 90 is adjacent to the horizontal wall 70.

Prior to operation, the operator must orient the stump cutter tooth 40 to select which one of the primary cutting edges (84, 100) will primarily impinge (or engage) upon the material (e.g., earth strata, wood products and the like) to be impinged and disintegrated, and then fasten the stump cutter tooth 40 in the selected orientation. During operation, the selected primary cutting edge (84, 100) impinges the material and experiences a greater amount of wear as compared to the other cutting edges. Over time, the selected primary cutting edge wears to a point where it does not function in an efficient and/or useful fashion. At this point (or shortly prior to this point), the operator will need to unfasten the stump cutter tooth 40 and rotate it 180 degrees to orient the other hard insert so its primary cutting edge primarily impinges upon the material. As can be appreciated, stump cutter tooth 40 provides an indexable cutter tooth that is relatively easy to unfasten and rotate to expose a new primary cutting edge.

FIG. 21 illustrates another specific embodiment, which is the preferred embodiment, of the stump cutter tooth generally designated as 300. Stump cutter tooth 300 has a central longitudinal axis F-F. Stump cutter tooth 300 has an elongate cutter tooth body 302 with an axial forward end 304 and an axial rearward end 306. The cutter tooth body 302 has a head portion 308 adjacent to the axial forward end 304, and a shank portion 310 adjacent to the axial rearward end 306. The head portion 308 presents a pair of opposite seating surfaces 312 and 314 wherein each seating surface has a generally vertical and a generally horizontal (as viewed in FIG. 21) surface. These seating surfaces 312, 314 are disposed about one hundred eighty degrees apart. The shank portion 310 has a threaded portion 320.

The head portion 308 further defines a flat stop surface 316 which is intended to abut against the shoulder in any one of the embodiments of the pocket when the stump cutter tooth 300 is retained by the pocket. The head portion 308 defines another flat stop surface disposed 180° from the flat stop surface 316.

Stump cutter tooth 300 further includes a pair of hard inserts 324A and 324B. Each one of the hard inserts (324A, 324B) has a generally arcuate flank surface (326A, 326B) a generally planar top rake surface (328A, 328B) and a generally planar rear surface (330A, 330B). It should be appreciated that top rake surface 328A of hard insert 324A lies in a first plane, and top rake surface 328B of hard insert 324B lies in a second plane. The first plane is different from the second plane. An imaginary line that is perpendicular to the first plane intersects a second imaginary line that is perpendicular to the second plane at an acute angle.

It should be appreciated that the generally planar rake surface, as well as the rear surface, could present a convex or a concave shape depending upon the specific application. It should be appreciated that the generally planar surfaces presented by the other hard inserts described herein could be convex or concave in shape.

The cutting edges 332A and 332B are at the intersections of the flank surfaces 326A and 326B, respectively, and the top surfaces 328A and 328B, respectively, wherein each one of the cutting edges (332A, 332B) has a generally arcuate shape. The hard inserts are spaced apart a small distance, which means that the rear surfaces of the hard inserts are spaced a small distance from one another. During use, either one of the hard inserts (324A, 324B) may become chipped or the like. It should be understood that the chipping of one of the hard inserts does not immediately cause chip damage to the other of the hard inserts due to the non-continuous nature of using separate hard inserts (or the physical distinctness or separateness of the hard inserts) instead of using a hard insert with one continuous unobstructed front face. In the alterative, the hard inserts 324 could be in abutment with one another at the rear surfaces 330. However, even if the hard inserts are in abutment, they still remain as separate and physically distinct members so as to possess the above advantage that retards the chipping.

Figure 23:
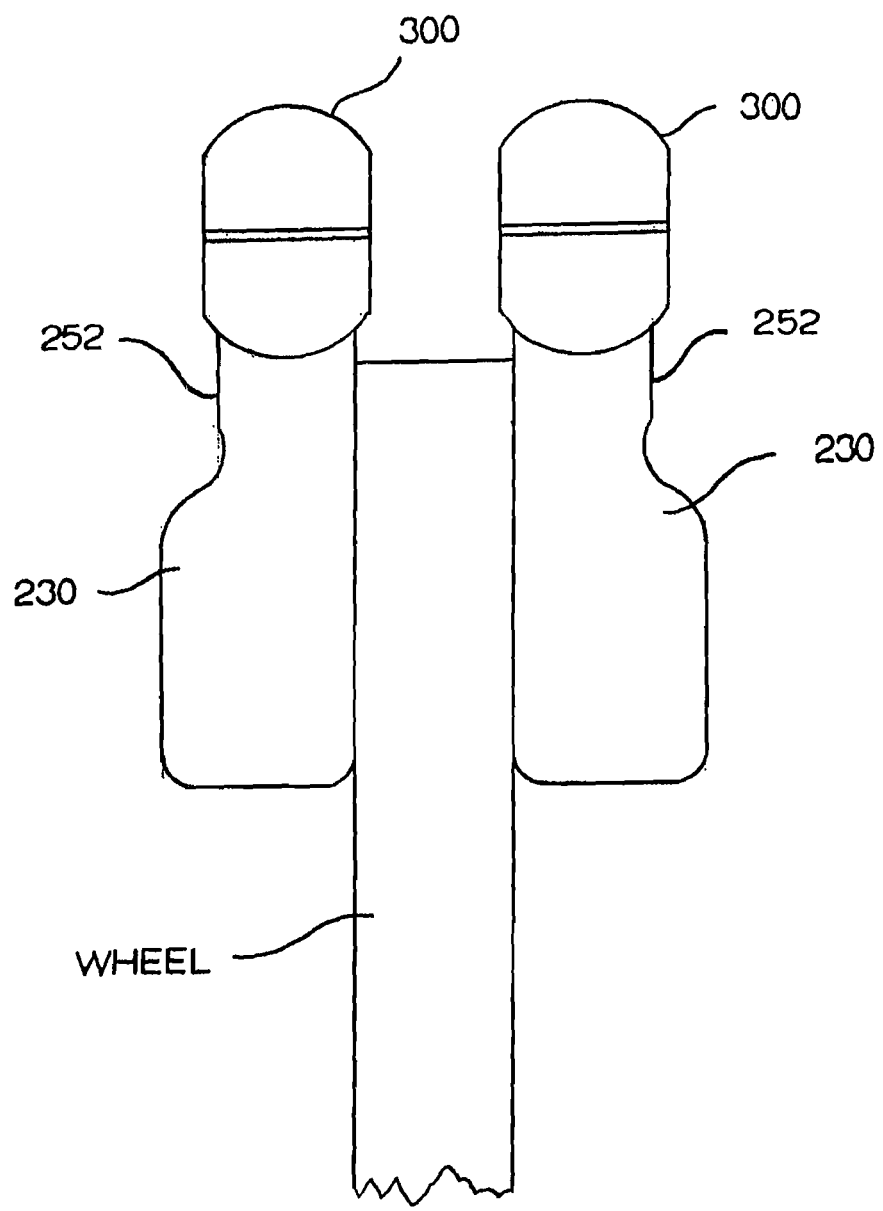
FIG. 23 is a view from one edge of two straight pocket members (with a stump cutter tooth mounted in each pocket) mounted (or operatively attached) to the cutting wheel in the vicinity of the periphery thereof.

Such as is shown in FIG. 23 in conjunction with the straight pocket 230, it is clear that the reduced portion 252 of the straight pocket 230 is narrower (i.e., has a lesser width as viewed from the edge in FIG. 23) than the stump cutting tooth at every point directly behind the front face of the stump cutting tooth during the time that the tooth-pocket assembly rotates so that the pocket is protected from excessive wear due to impingement.

Each one of the hard inserts (324A, 324B) is made from a hard material such as, for example, cemented (cobalt) tungsten carbide. In this regard, a typical nominal composition of cemented (cobalt) tungsten carbide contains about 9.5 weight percent cobalt with the balance tungsten carbide and recognized impurities. It should also be appreciated that there may be additives (e.g., niobium, tantalum, titanium, chromium) that provide certain properties to the cemented (cobalt) tungsten carbide. The binder (i.e., cobalt) may also include iron and/or nickel. The average grain size of the tungsten carbide (or other hard particles) may be selected to impart desired properties to the cemented (cobalt) tungsten carbide. It is contemplated that the hard insert may also be made from any one of polycrystalline diamond material, ceramics (e.g., alumina-based ceramics) or cermets (titanium-based cermets).

It should be appreciated that the hard inserts exhibit a hardness that is greater than the hardness of the cutter bit body. Thus, it can be appreciated that the axial forward portion of the stump cutter tooth is harder than the axial rearward portion thereof. It is contemplated that in some instances, the axial forward portion of the cutter tooth body may exhibit a higher hardness than the balance of the cutter tooth body.

Brazing is the preferred way to affix the hard inserts to the elongate body. One typical braze alloy is TRICON 080 which has a composition in weight percent of about 54.85% copper, about 25.00% zinc, about 8.00% nickel, about 12.00% manganese and about 0.15% silicon. This braze alloy is available from Tricon, Inc., 2325 Wisconsin Avenue, Downers Grove, Ill. 60515.

It should be appreciated that the hard inserts may also be affixed to the cutter tooth body via an adhesive such as, for example, an epoxy. Further, it is contemplated that the hard inserts may be affixed to the cutter tooth body via mechanical means such as, for example, a clamp or bolt or the like that mechanically acts on the hard insert.

It should be appreciated that the steel bodies for the stump cutter teeth pockets can be made via a number of different processes including a process to quench and temper a carbon steel or an alloy steel. These pockets and cutter tooth bodies could also be cold headed forged or hot forged or investment cast or machined from wrought steel. For the steel body of the stump cutter tooth, a preferred material is a AISI/SAE 15B37 MOD material that has been quenched and tempered to a hardness within the range of about 40 to about 45 Rockwell "C" per a process shown and disclosed in U.S. Pat. No. 4,627,665. For the pockets, a preferred material is a hot forged AISI/SAE 4140H steel that has been quenched and tempered to a hardness within a range of about 35 to about 40 Rockwell "C".

It should be pointed out that the above discussion of the materials for the hard inserts and the cutter bodies and pockets, as well as the materials for the braze alloys, and other means to attach the hard inserts to the cutter bodies and the hardness profiles of the cutter bodies and the relative hardness of the hard inserts as compared to the cutter bodies apply to all of the specific embodiments of the stump cutter teeth and pockets, even if not specifically set forth in conjunction therewith.

In reference to FIGS. 21 and 22, which shows a combination of the stump cutter tooth 300 and the offset pocket member 360, the abutment surfaces 316 on the stump cutter tooth 300 are disposed behind the hard inserts of the stump cutter tooth 300 when the cutting wheel 26 is rotating in one direction. One abutment surface 316 is in operative engagement with the first shoulder 390A of the offset pocket member 360 to prevent rotation of the stump cutter tooth 300 with respect to the offset pocket member 360.

The stump cutter tooth 300 has a second position with respect to the pocket member 360 wherein the second abutment surface of the stump cutter tooth 300 is in contact with the second shoulder 390B of the offset pocket member 360 whereby the leading edge of the stump cutter tooth 300 is reversed and thereby shields the second edge of the pocket member and the second shoulder 390B of the pocket member 360 from wear. It is shown that the hard insert is at least as wide as the radial outer portion of the pocket member 360 so as to shield the radial outer portion of the offset pocket member from excessive wear. It is also shown that the stump cutter tooth has an unobstructed front face wherein every point on the first or second shoulders follows directly behind, and is thereby shielded by, the front face as the cutting wheel rotates.

During operation using the stump cutter tooth 300, one of the hard inserts 324 engages the material being cut (e.g., a stump) and can be considered to be the engaged hard insert. It is believed that the other hard insert, which is the non-engaged hard insert, functions to provide protection to the pocket in the region adjacent to the non-engaged hard insert. It is believed that the non-engaged hard insert providing this protection, contributes to the increase in the useful life of the stump cutter tooth and pocket. It is contemplated that as an alternative embodiment, the stump cutter tooth may have a first hard insert that functions as a cutting insert (i.e., presents a cutting edge) and a second hard insert or hard region that is oppositely disposed to the first hard insert. The second hard insert may optionally not have a cutting edge and would be expected to provide protection to the pocket in a manner similar to the non-engaged hard cutting insert of cutter tooth 300.

Referring to FIG. 23, there is shown the relationship between two straight pockets 230 (with a stump cutter tooth 300 mounted in each pocket) affixed in the vicinity of the periphery of the driven wheel. As described hereinabove in conjunction with FIG. 5A with reference to FIG. 18, the cap screws enter through the counterbored bore and pass through corresponding holes in the wheel. The threaded shank of the cap screw engages the threaded bores in the corresponding pocket and the pockets are secured to the wheel through tightening of the cap screws.

Figure 24:
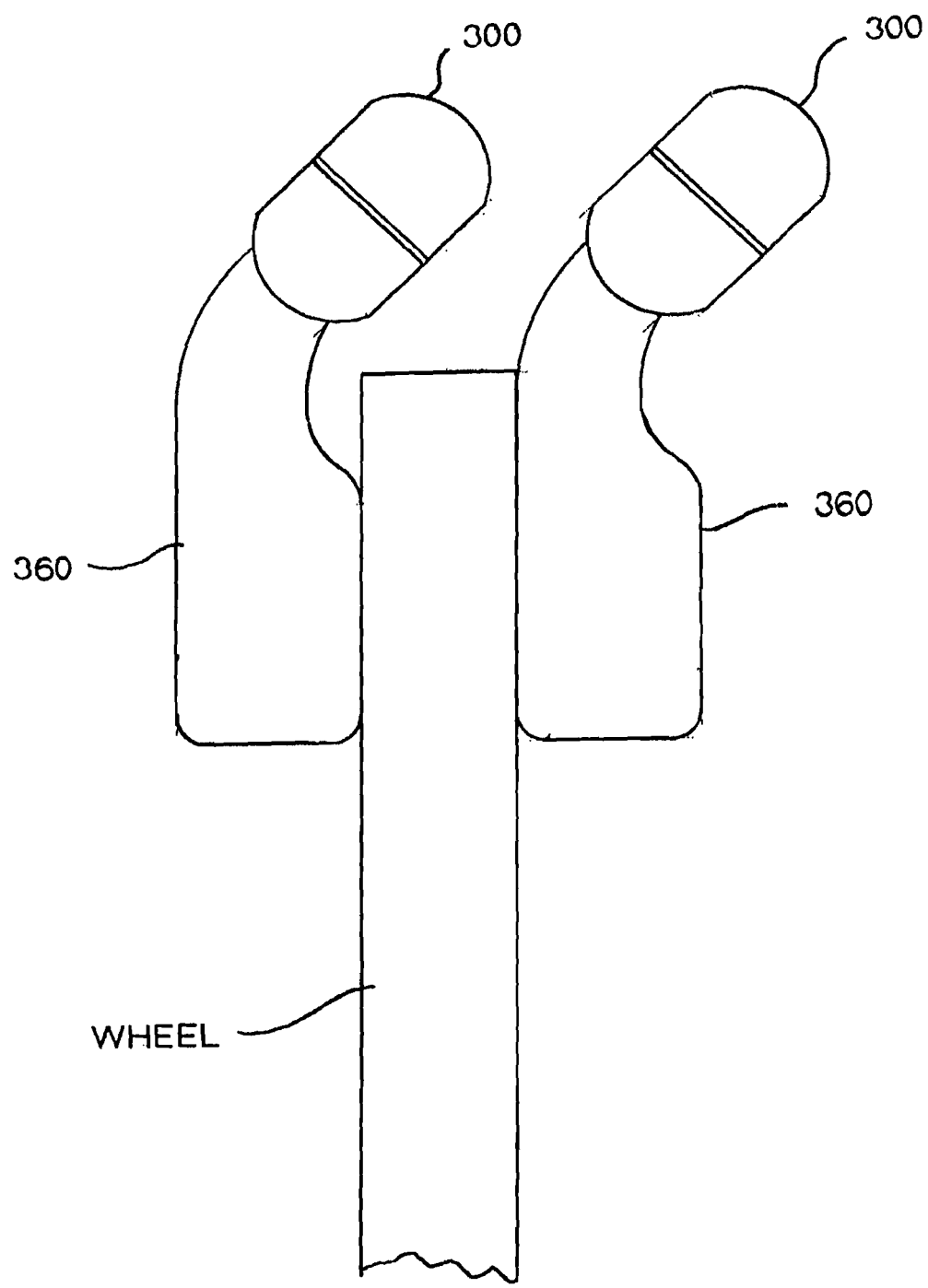
FIG. 24 is a view from one edge of a cross-over pocket member and an offset pocket member (with a stump cutter tooth mounted in each pocket) mounted (or operatively attached) to the cutting wheel in the vicinity of the periphery thereof.

Referring to FIG. 24, there is shown the relationship between a cross-over pocket and an offset pocket 360 (with a stump cutter tooth 300 mounted in each pocket) when they are affixed in the vicinity of the periphery of the driven wheel. As described hereinabove in conjunction with other pocket members, the bolts enter through the counter bored bore and pass through corresponding holes in the wheel. The threaded shank engages the threaded bores in the corresponding pocket and the pockets are secured to the wheel through tightening of the bolts.

Figure 25:
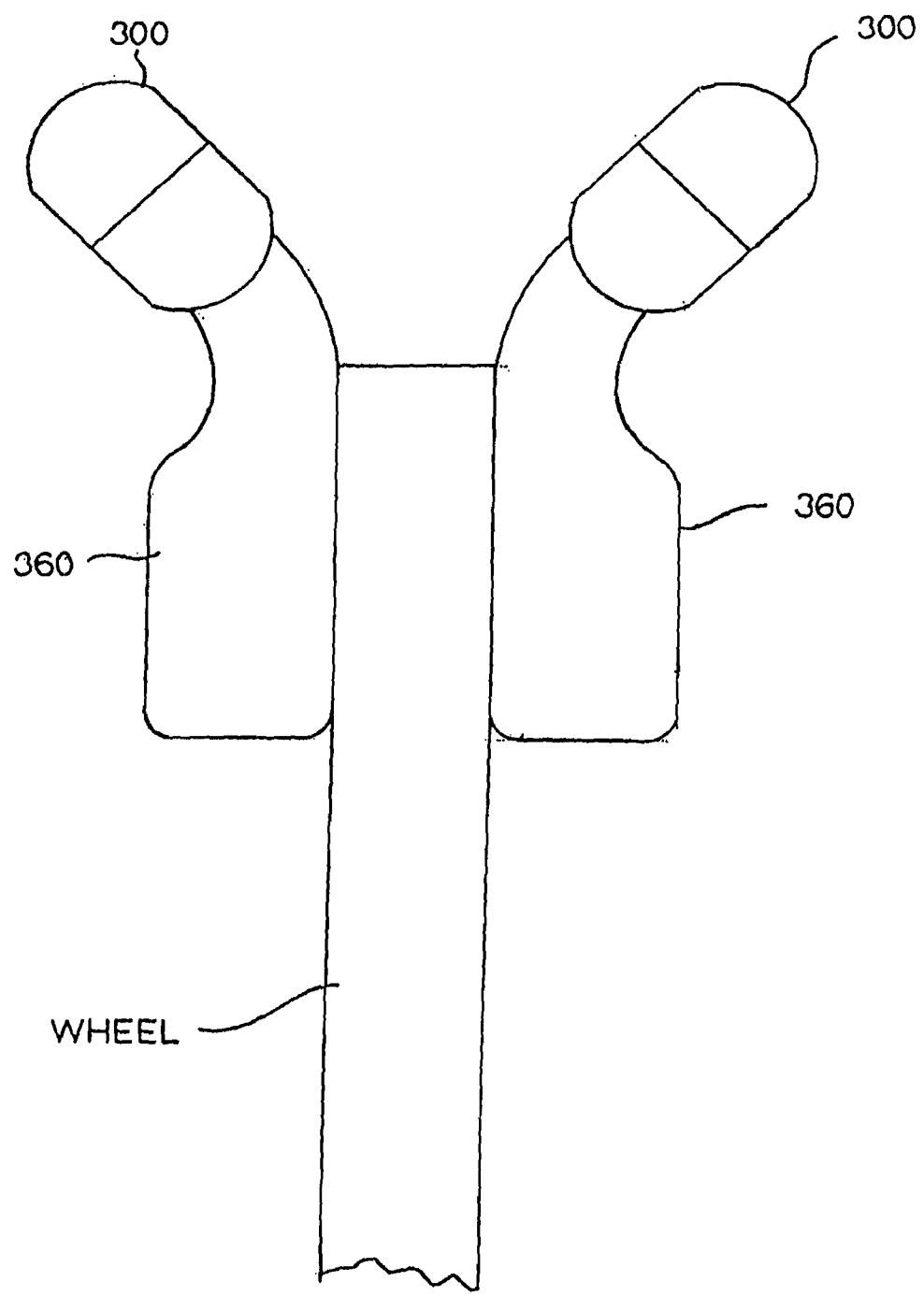
FIG. 25 is a view from one edge of two offset pockets (with a stump cutter tooth mounted in each pocket) mounted (or operatively attached) to the cutting wheel in the vicinity of the periphery thereof.

Referring to FIG. 25, there is shown the relationship between two offset pockets (with a stump cutter tooth mounted in each pocket) affixed in the vicinity of the periphery of the driven wheel. As shown in FIG. 18, the cap screws enter through the counterbored bore and pass through corresponding holes in the wheel. The threaded shank engages the threaded bores in the corresponding pocket and the pockets are secured to the wheel through tightening of the cap screws.

Figure 26:
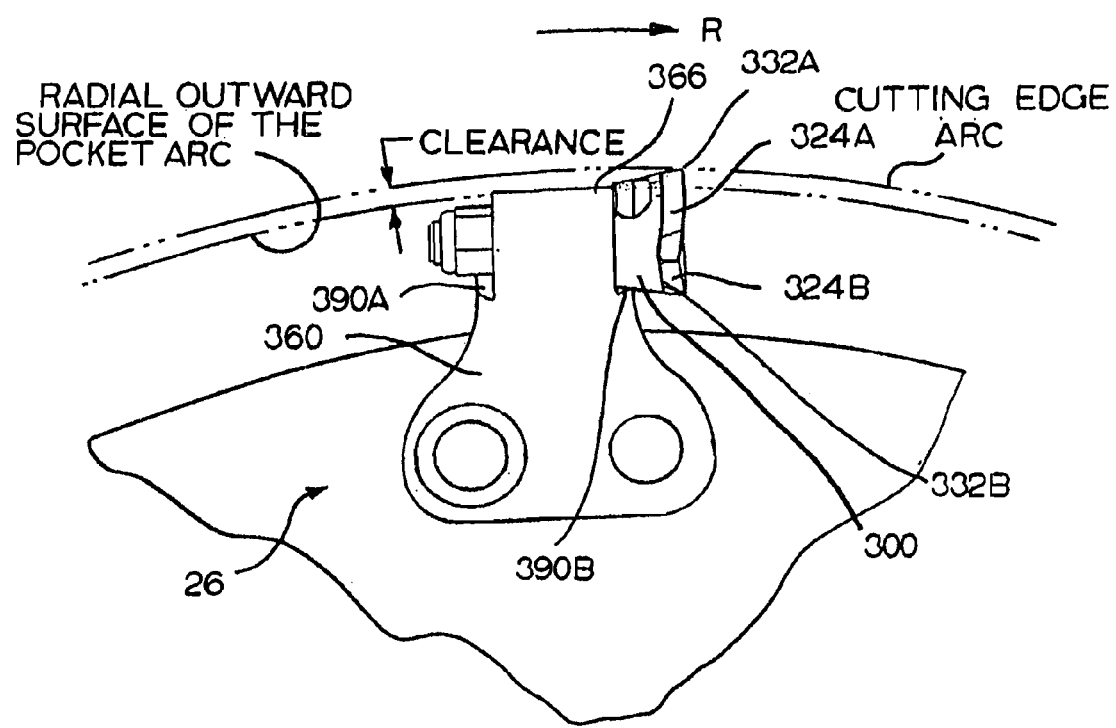
FIG. 26 is a side view showing a stump cutter tooth assembly (i.e., stump cutter tooth and pocket) mounted (or operatively attached) to the cutting wheel in the vicinity of the periphery thereof wherein there is shown radial arcs that illustrate the clearance between the cutting edge of the stump cutter tooth and the top surface (or radial outer surface) of the pocket.

Referring to FIG. 26, there is shown a side view showing a stump cutter tooth assembly (i.e., stump cutter tooth 300 and offset pocket 360) mounted to the driven cutting wheel in the vicinity of the periphery thereof. There are shown radial arcs that illustrate the clearance between the cutting edge of the stump cutter tooth and the top surface of the pocket. It can be seen that the cutting edge 332A of the hard insert 324A extends radially outwardly past (so that it is at least as far) the radial outer portion (or radial outer end 366) of the pocket member 360. As shown by FIG. 26, there is a clearance between the arc defined by the cutting edge of the engaged hard insert and the radial outward surface of the pocket.

It is believed that by increasing this clearance, which is the case with the stump cutter tooth as shown in FIG. 21, the hard insert 324A shields the radial outer portion of the pocket 360 so that there is an increase in the protection from wear for the radial outward surface of the pocket, as well as the nut that secures the stump cutter tooth to the pocket. In other words, these portions of the pocket do not experience as much impingement from direct contact with the uncut stump and/or the debris resulting from the stump cutting operation. The useful life of the stump cutter assembly is increased by providing this increase in protection to the pocket. Still referring to FIG. 26, it can be seen that first edge also extending radially inwardly in front of the first shoulder for shielding the front shoulder from excessive wear during rotation.

Referring to the specific embodiment illustrated in FIGS. 27 and 28, there is shown another embodiment of a stump cutter tooth 110 that has a cutter tooth body 112 with an axial forward end 114 and an axial rearward end 116. The cutter tooth body 112 has a shank 118 at the rearward end 116 thereof wherein the shank 118 has a threaded section 120. The cutter tooth body 112 has a head section 122 at the axial forward end 114 thereof. The head section 122 presents three lobed support surfaces 124 wherein each one of the support surfaces 124 is the same.

Stump cutter tooth 110 further includes a trio of hard inserts 134 wherein each support surface 124 carries a hard insert 134. Each hard insert 134 has an arcuate primary cutting edge 136

Prior to operation, the operator must orient the stump cutter tooth 110 to select which one of the three primary cutting edges 136 will primarily impinge upon the material (e.g., earth strata, wood products and the like) to be impinged and disintegrated, and then fasten the stump cutter tooth 110 in the selected orientation. During operation, the selected primary cutting edge 136 impinges the material and experiences a greater amount of wear as compared to the other cutting edges. Over time, the selected primary cutting edge wears to a point where it does not function in an efficient and/or useful fashion. At this point (or shortly prior to this point), the operator will need to unfasten the stump cutter tooth 110 and rotate it 120 degrees to orient the other hard insert so its primary cutting edge primarily impinges upon the material. As can be appreciated, stump cutter tooth 110 provides an indexable cutter tooth that is relatively easy to unfasten and rotate to expose a new primary cutting edge.

Referring to the specific embodiment illustrated in FIGS. 29 and 30, there is shown still another embodiment of a stump cutter tooth generally designated as 150 that has a cutter tooth body 152 with an axial forward end 154 and an axial rearward end 156. The cutter tooth body 152 has a shank 158 at the rearward end 156 thereof wherein the shank 158 has a threaded section 160. The cutter tooth body 152 has a head section 162 at the axial forward end 154 thereof. The head section 162 presents three lobed support surfaces 164 wherein each one of the support surfaces 164 is the same.

Stump cutter tooth 150 further includes a hard insert 170 that presents three distinct lobes (172, 174, 176). Each one of the lobes 172, 174, 176 presents a primary arcuate cutting edge 178, 180 and 182, respectively.

Prior to operation, the operator must orient the stump cutter tooth 190 to select which one of the three primary cutting edges (178, 180, 182) will primarily impinge upon the material (e.g., earth strata, wood products and the like) to be impinged and disintegrated, and then fasten the stump cutter tooth 150 in the selected orientation. During operation, the selected primary cutting edge (e.g., 178) impinges the material and experiences a greater amount of wear as compared to the other cutting edges. Over time, the selected primary cutting edge wears to a point where it does not function in an efficient and/or useful fashion. At this point (or shortly prior to this point), the operator will need to unfasten the stump cutter tooth 150 and rotate it 120 degrees to orient another cutting edge (e.g., 180) to impinge upon the material. As can be appreciated, stump cutter tooth 150 provides an indexable cutter tooth that is relatively easy to unfasten and rotate to expose a new primary cutting edge.

Figure 31:
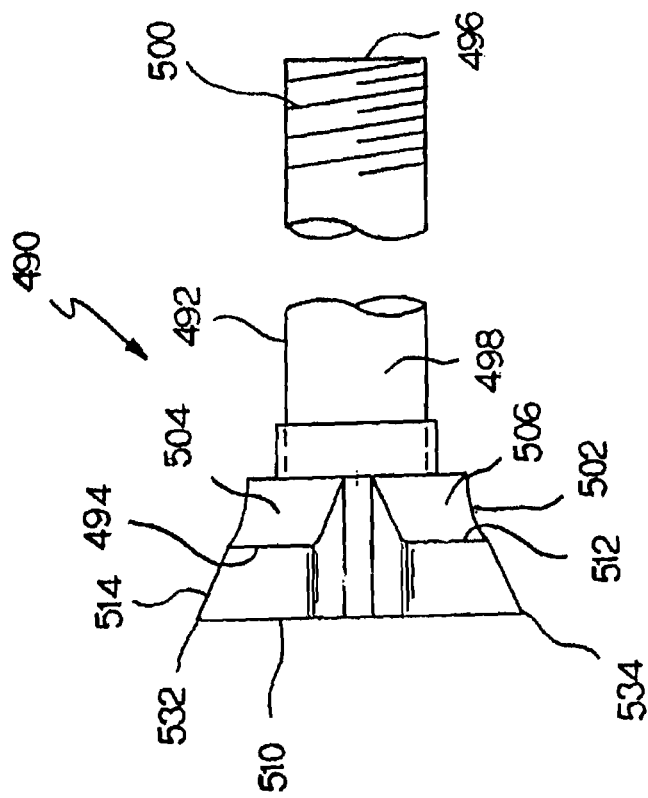
FIG. 31 is a side view of another specific embodiment of a stump cutter tooth of the invention wherein a single monolithic cutting insert presents four separate arcuate cutting edges.
Figure 32:
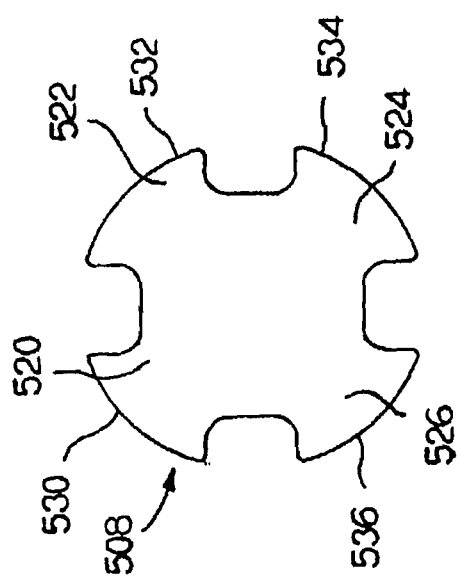
FIG. 32 is a front view of the stump cutter tooth of FIG. 31.

Referring to the specific embodiment illustrated in FIGS. 31 and 32, there is shown yet another embodiment of a stump cutter tooth generally designated as 490 that has a cutter tooth body 492 with an axial forward end 494 and an axial rearward end 496. The cutter tooth body 492 has a shank 498 at the rearward end 496 thereof wherein the shank 498 has a threaded section 500. The cutter tooth body 492 has a head section 502 at the axial forward end 494 thereof. The head section 502 presents four lobed support surfaces (504, 506, other lobed sections not illustrated) wherein each one of the support surfaces is the same.

Stump cutter tooth 490 further includes a hard insert generally designated as 508 that has a top surface 510 and a bottom surface 512. A peripheral side surface 514 joins the top surface 510 and the bottom surface 512. The hard insert 508 presents four distinct lobes (520, 522, 524 526). Each one of the lobes (520, 522, 524, 526) has a cutting edge 530, 532, 534, 536, respectively.

Prior to operation, the operator must orient the stump cutter tooth 490 to select which one of the four primary cutting edges (530, 532, 534, 536) will primarily impinge upon the material (e.g., earth strata, wood products and the like) to be impinged and disintegrated, and then fasten the stump cutter tooth 490 in the selected orientation. During operation, the selected primary cutting edge (e.g., 530) impinges the material and experiences a greater amount of wear as compared to the other cutting edges. Over time, the selected primary cutting edge wears to a point where it does not function in an efficient and/or useful fashion. At this point (or shortly prior to this point), the operator will need to unfasten the stump cutter tooth 490 and rotate it 90 degrees to orient another cutting edge (e.g., 532) to impinge upon the material. As can be appreciated, stump cutter tooth 490 provides an indexable cutter tooth that is relatively easy to unfasten and rotate to expose a new primary cutting edge.

It should be appreciated that enhanced operational efficiency can be achieved when a driven wheel carries a combination of the offset pockets along with the cross-over pockets and the straight pockets. In this regard, the majority of the pockets are the offset pockets. The cross-over pockets and the straight pockets are intermittently positioned between the offset pockets. The presence of the cross-over pockets and the straight pocket allows for the stump cutter teeth carried thereby to function to break up the wider piece of material left between the opposing offset pockets. The combination of the stump cutter teeth carried by the offset pockets and the cutter teeth carried by the cross-over pockets and the straight pockets provides for an enhanced operational efficiency of the stump cutter apparatus.

It should also be appreciated that the abutment between the shoulder on the pocket (straight or offset) and the shoulder or flat surface on the stump cutter tooth facilitate the retention of the stump cutter tooth in a non-rotatable condition. By maintaining the tooth in such a non-rotatable condition, the overall operation of the stump cutter apparatus is enhanced.

It should also be appreciated that the stump cutter tooth 300 has the feature of being able to be rotated 180 degrees to present a new hard insert. This feature provides for an easier and less time-consuming way to replace a broken or worn hard insert with a new hard insert. By providing an easier and less time-consuming way to replace a broken or worn hard insert with a new hard insert, the present invention enhances the operational efficiency of the stump cutter apparatus.

It is clear that the present invention provides an improved stump cutter tooth that experiences a reduction in events (e.g., the breakage or wear) that require replacement thereof. Further, the present invention provides an improved stump cutter tooth assembly (including the pocket and associated components) that experiences a reduction in events (e.g., the breakage or wear) that require replacement of the other components of the stump cutter tooth assembly including without limitation the pocket and associated fasteners. Among other things, the capability of the stump cutter tooth to provide either a hard region or a non-engaged hard insert that provides protection to the pocket facilitates the reduction in the breakage and/or wear of the stump cutter tooth.

Also, the present invention provides an improved stump cutter tooth, as well as an assembly that uses the improved stump cutter tooth, that enhances the operational efficiencies connected with replacement of stump cutter teeth or other components of the stump cutter assembly. Among other things, the capability of the stump cutter tooth to be indexed 180 degrees so as to present a new cutting edge of a previously non-engaged hard insert increases the serviceability and reduces downtime connected with the operation of the stump cutter. Further, the bi-directional capability of the different styles of pockets increases the serviceability and reduces downtime connected with the operation of the stump cutter.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A stump cutter assembly comprising:
    a driven wheel having a first wheel side surface and a second wheel side surface;
    a first stump cutter tooth assembly for operative attachment to the first wheel side surface and a second stump cutter tooth assembly for operative attachment to the second wheel side surface;
    the first stump cutter tooth assembly comprising a first stump cutter tooth and a first bi-directional pocket member;
    the second stump cutter tooth assembly comprising a second stump cutter tooth and a second bi-directional pocket member; and
    the first stump cutter tooth assembly being in general transverse alignment with the second stump cutter tooth assembly,
    wherein the first bi-directional pocket member comprises a first bi-directional pocket body having a radial inward first bi-directional pocket portion and an integral radial outward first bi-directional pocket portion; the radial inward first bi-directional pocket portion containing first attachment bores used to operatively attach the first bi-directional pocket member to the first wheel side surface of the driven wheel; the radial outward first bi-directional pocket portion containing a first retention bore used to retain the first stump cutter tooth therein,
    wherein the first retention bore extending extends generally parallel to the first wheel side surface, extends generally tangentially relative to an outer diameter of the driven wheel, and passing passes from a first edge surface on a first side of the radial outward first bi-directional pocket portion to an opposing second edge surface on a second side of the radial outward first bi-directional pocket portion;
    wherein each of the first edge surface and the second edge surface of the first bi-directional pocket member contains a shoulder for nonrotatably retaining the first stump cutter tooth; and
    wherein the second bi-directional pocket member comprises a second bi-directional pocket body having a radial inward second bi-directional pocket portion and an integral radial outward second bi-directional pocket portion; the radial outward second bi-directional pocket portion containing second attachment bores used to operatively attach the second bi-directional pocket member to the second wheel side surface of the driven wheel; and the radial outward second bi-directional pocket portion containing a second retention bore used to retain the second stump cutter tooth therein, the second retention bore extending generally parallel to the second wheel side surface and passing from a first edge surface on a first side of the radial outward second bi-directional pocket portion to an opposing second edge surface on a second side of the radial outward second bi-directional pocket portion, wherein each of the first edge surface and the second edge surface of the second bi-directional pocket member contains a shoulder for nonrotatably retaining the second stump cutter tooth.

2. The stump cutter assembly according to claim 1 wherein the radial inward first bi-directional pocket portion having a central longitudinal axis and the radial outward first bi-directional pocket portion having a central longitudinal axis; and the first bi-directional pocket member being selected from the group consisting of:
    a straight first bi-directional pocket member wherein the radial inward first bidirectional pocket portion and the radial outward first bi-directional pocket portion being in general axial alignment, and
    a cross-over first bi-directional pocket member wherein the radial inward first bidirectional pocket portion and the radial outward first bi-directional pocket portion being disposed at an angle with respect to one another such that the radial outward first bi-directional pocket member being disposed toward the first wheel side surface to which the first bi-directional pocket member is attached, and
    an offset first bi-directional pocket member wherein the radial inward first bidirectional pocket portion and the radial outward first bi-directional pocket portion being disposed at an angle with respect to one another such that the radial outward first bi-directional pocket member being disposed away from the first wheel side surface to which the first bi-directional pocket member is attached.

3. The stump cutter assembly according to claim 2 wherein the radial inward second bi-directional pocket portion having a central longitudinal axis and the radial outward second bi-directional pocket portion having a central longitudinal axis; and the second bi-directional pocket member being selected from the group consisting of:
- a straight second bi-directional pocket member wherein the radial inward second bidirectional pocket portion and the radial outward second bi-directional pocket portion being in general alignment, and
- a cross-over second bi-directional pocket member wherein the radial inward second bi-directional pocket portion and the radial outward second bi-directional pocket portion being disposed at an angle with respect to one another such that the radial outward second bi-directional pocket member being disposed toward the second wheel side surface to which the second bi-directional pocket member is attached, and
- an offset second bi-directional pocket member wherein the radial inward second bidirectional pocket portion and the radial outward second bi-directional pocket portion being disposed at an angle with respect to one another such that the radial outward second bi-directional pocket member being disposed away from the second wheel side surface to which the second bi-directional pocket member is attached.

4. The stump cutter assembly according to claim 3 wherein the first bi-directional pocket member being the straight first bi-directional pocket member and the second bi-directional pocket member being the straight second bi-directional pocket member.

5. The stump cutter assembly according to claim 3 wherein the first bi-directional pocket member being the offset first bi-directional pocket member and the second bi-directional pocket member being the offset second bi-directional pocket member.

6. The stump cutter assembly according to claim 3 wherein the first bi-directional pocket member being the cross-over first bi-directional pocket member and the second bi-directional pocket member being the offset second bi-directional pocket member.

7. The stump cutter assembly according to claim 3 wherein the first bi-directional pocket member being the offset first bi-directional pocket member and the second bi-directional pocket member being the straight second bi-directional pocket member.

8. The stump cutter assembly according to claim 3 wherein the first bi-directional pocket member being the cross-over first bi-directional pocket member and the second bi-directional pocket member being the straight second bi-directional pocket member.

9. The stump cutter assembly according to claim 1 wherein the first attachment bores comprise a first threaded bore and a first bore with a first counterbore, and the second attachment bores comprise a second threaded bore and a second bore with a second counterbore, and the first threaded bore is in general transverse alignment with the second bore with the second counterbore, and the second threaded bore is in general transverse alignment with the first bore with the first counterbore.

10. The stump cutter assembly according to claim 9 wherein a first retainer passes through the second bore with the second counterbore to engage the first threaded bore, and a second retainer passes through the first bore with the first counterbore to engage the second threaded bore.

11. A stump cutter assembly comprising:
- a driven wheel having a first wheel side surface and a second wheel side surface;
- a first stump cutter tooth assembly for operative attachment to the first wheel side surface and a second stump cutter tooth assembly for operative attachment to the second wheel side surface;
- the first stump cutter tooth assembly comprising a first stump cutter tooth and a first bi-directional pocket member, wherein the first bi-directional pocket member nonrotatably retains the first stump cutter tooth;
- the second stump cutter tooth assembly comprising a second stump cutter tooth and a second bi-directional pocket member, wherein the second bi-directional pocket member non-rotatably retains the second stump cutter tooth; and
- the first stump cutter tooth assembly being in general transverse alignment with the second stump cutter tooth assembly; and
- wherein the first stump cutter tooth comprises an elongate first tooth body having a first central longitudinal axis generally tangential to an outer diameter of the driven wheel, the elongate first tooth body having a head portion at an axial forward end, the elongate first tooth body having a shank portion at an axial rearward end, a first hard insert being at the axial forward end of the first tooth body and defining a first arcuate flank surface, a first top surface and a first leading arcuate cutting edge formed at an intersection with the first arcuate flank surface and the first top surface that has an orientation to directly engage the stump during rotation of the driven wheel, the first hard insert having a first trailing edge which rotationally trails the first leading arcuate cutting edge, and a second hard insert being at the axial forward end of the first tooth body, the second hard insert having a second arcuate flank surface, a second top surface, and a second leading arcuate cutting edge formed at an intersection with the second arcuate flank surface and the second top surface, the second hard insert having a second trailing edge which rotationally trails the second leading arcuate cutting edge, and the second hard insert being distinct from the first hard insert, and the second hard insert provides protection to at least a portion of the first bi-directional pocket member; the first trailing edge being opposite of and closely adjacent to the second trailing edge, and a portion of the first trailing edge and a portion of the second trailing edge being closely adjacent to the first central longitudinal axis of the elongate first tooth body; and the first trailing edge is generally straight, and the second trailing edge is generally straight; and the first trailing edge being generally parallel to the second trailing edge; and the second stump cutter tooth comprising an elongate second tooth body having a second central longitudinal axis generally tangential to the outer diameter of the driven wheel, the elongate second tooth body having a head portion at an axial forward end, the elongate second tooth body having a shank portion at an axial rearward end, a third hard insert being at the axial forward end of the second tooth body and defining a third arcuate flank surface, a third top surface and a third leading arcuate cutting edge formed at an intersection with the third arcuate flank surface and the third top surface that has an orientation to directly engage the stump during rotation of the driven wheel, the third hard insert having a third trailing edge which rotationally trails the third leading arcuate cutting edge, and a fourth hard insert being at the axial forward end of the second tooth body, the fourth hard insert having a fourth arcuate flank surface, a fourth top surface and a fourth leading arcuate cutting edge formed at an intersection with the fourth arcuate flank surface and the fourth top surface, the fourth hard insert having a fourth trailing edge which rotationally trails the fourth leading arcuate cutting edge, and the fourth hard insert being distinct from the third hard insert, and the fourth hard insert provides protection to at least a portion of the second bi-directional pocket member; the third trailing edge being opposite of and closely adjacent to the fourth trailing edge, and a portion of the third trailing edge and a portion of the fourth trailing edge being closely adjacent to the second central longitudinal axis of the elongate second tooth body; and the third trailing edge is generally straight, and the fourth trailing edge is generally straight; and the third trailing edge being generally parallel to the fourth trailing edge.

12. The stump cutter assembly according to claim 11 wherein the second hard insert having an orientation to not directly engage the stump, and wherein the second leading cutting edge being distinct from the first leading cutting edge; and the fourth hard insert having an orientation to not directly engage the stump, and wherein the fourth leading cutting edge being distinct from the third leading cutting edge.

13. The stump cutter assembly according to claim 11 wherein a portion of the first trailing edge and a portion of the second trailing edge being closely adjacent to the first central longitudinal axis of the elongate first tooth body wherein the adjacent portion of the second trailing edge being within a volume of an axial forward extension of the shank portion of the first tooth body; and a portion of the third trailing edge and a portion of the fourth trailing edge being closely adjacent to the second central longitudinal axis of the elongate second tooth body wherein the adjacent portion of the third trailing edge and the adjacent portion of the fourth trailing edge being within a volume of an axial forward extension of the shank portion of the second tooth body.

14. A stump cutter assembly comprising:
a driven wheel having a first wheel side surface and a second wheel side surface;
a first stump cutter tooth assembly for operative attachment to the first wheel side surface and a second stump cutter tooth assembly for operative attachment to the second wheel side surface;
the first stump cutter tooth assembly comprising a first stump cutter tooth and a first bi-directional pocket member having a first retainer aperture and a second retainer aperture wherein the second retainer aperture is different from the first retainer aperture, wherein the first bi-directional pocket member non-rotatably retains the first stump cutter tooth;
the second stump cutter tooth assembly comprising a second stump cutter tooth and a second bi-directional pocket member having a third retainer aperture and a fourth retainer aperture wherein the fourth retainer aperture is different from the third retainer aperture, wherein the second bi-directional pocket member non-rotatably retains the second stump cutter tooth;
the first stump cutter tooth assembly being in general transverse alignment with the second stump cutter tooth assembly; and
a first retainer passes through the first retainer aperture and the driven wheel and the engages the third retainer aperture, and a second retainer passes through the fourth retainer aperture and the drive wheel and engages the second retainer aperture,
wherein the first bi-directional pocket member comprises a first bi-directional pocket body having a radial inward first bi-directional pocket portion and an integral radial outward first bi-directional pocket portion; the radial inward first bi-directional pocket portion containing first attachment bores used to operatively attach the first bi-directional pocket member to the first wheel side surface of the driven wheel; the radial outward first bi-directional pocket portion containing a first retention bore used to retain the first stump cutter tooth therein, the first retention bore extending generally parallel to the first wheel side surface, extending generally tangentially to an outer diameter of the driven wheel, and passing from a first edge surface on a first side of the radial outward first bi-directional pocket portion to an opposing second edge surface on a second side of the radial outward first bi-directional pocket portion, wherein each of the first edge surface and the second edge surface of the first bi-directional pocket member contains a shoulder for nonrotatably retaining the first stump cutter tooth; and
wherein the second bi-directional pocket member comprises a second bi-directional pocket body having a radial inward second bi-directional pocket portion and an integral radial outward second bi-directional pocket portion; the radial inward second bi-directional pocket portion containing second attachment bores used to operatively attach the second bi-directional pocket member to the second wheel side surface of the driven wheel; and the radial outward second bi-directional pocket portion containing a second retention bore used to retain the second stump cutter tooth therein, wherein the second bi-directional pocket member comprises a second bi-directional pocket body having a radial inward second bi-directional pocket portion and an integral radial outward second bi-directional pocket portion; the radial outward second bi-directional pocket portion containing second attachment bores used to operatively attach the second bi-directional pocket member to the second wheel side surface of the driven wheel; and the radial outward second bi-directional pocket portion containing a second retention bore used to retain the second stump cutter tooth therein, the second retention bore extending generally parallel to the second wheel side surface, extending generally tangentially to an outer diameter of the driven wheel, and passing from a first edge surface on a first side of the radial outward second bi-directional pocket portion to an opposing second edge surface on a second side of the radial outward second bi-directional pocket portion, wherein each of the first edge surface and the second edge surface of the second bi-directional pocket member contains a shoulder for nonrotatably retaining the second stump cutter tooth.

15. The stump cutter assembly according to claim 14 wherein the first retainer has a first end and a second end, and the first retainer aperture of the first bidirectional pocket member is configured for operative engagement with the first end of the first retainer and the fourth retainer aperture of the second bi-directional pocket member is configured for operative engagement with the second end of the first retainer; and the second retainer has a third end and a fourth end, and the second retainer aperture of the first bidirectional pocket member is configured for operative engagement with the fourth end of the second retainer and the third retainer aperture of the second bi-directional pocket member is configured for operative engagement with the third end of the second retainer.

\* \* \* \* \*